(12) United States Patent
Sato

(10) Patent No.: US 12,019,231 B2
(45) Date of Patent: Jun. 25, 2024

(54) DEVICE FOR ANALYZING SIZE OF STEP IN PAIR OF DIVIDED MIRRORS OF TELESCOPE

(71) Applicant: Japan Aerospace Exploration Agency, Tokyo (JP)

(72) Inventor: Seichi Sato, Chofu (JP)

(73) Assignee: Japan Aerospace Exploration Agency, Tokyo (JP)

( * ) Notice: Subject to any disclaimer, the term of this patent is extended or adjusted under 35 U.S.C. 154(b) by 477 days.

(21) Appl. No.: 17/418,501

(22) PCT Filed: Dec. 26, 2019

(86) PCT No.: PCT/JP2019/051221
§ 371 (c)(1),
(2) Date: Jun. 25, 2021

(87) PCT Pub. No.: WO2020/138328
PCT Pub. Date: Jul. 2, 2020

(65) Prior Publication Data
US 2022/0082811 A1    Mar. 17, 2022

(30) Foreign Application Priority Data
Dec. 26, 2018  (JP) .................................. 2018-243100

(51) Int. Cl.
*G02B 23/06* (2006.01)
*G01B 11/14* (2006.01)
(Continued)

(52) U.S. Cl.
CPC .............. *G02B 23/06* (2013.01); *G01B 11/14* (2013.01); *G02B 5/10* (2013.01); *G02B 7/183* (2013.01); *G02B 23/16* (2013.01)

(58) Field of Classification Search
CPC .......... G02B 23/06; G02B 5/10; G02B 7/183; G02B 23/16; G02B 5/09; G02B 7/198; G02B 27/62; G01B 11/14; G01M 11/005
See application file for complete search history.

(56) References Cited

U.S. PATENT DOCUMENTS 5,120,948 A * 6/1992 Wertheimer ........... G02B 26/06
                                                      250/201.9
5,146,072 A   9/1992 Dey et al.

OTHER PUBLICATIONS

Wertheimer et al; "High-accuracy white-light optical piston sensor for segmented optics"; Proceedings of SPIE vol. 1755 Interferometry: Techniques and Analysis, The International Society for Optical Engineering; Feb. 5, 1993; pp. 103-113; San Diego, CA.

* cited by examiner

*Primary Examiner* — Wyatt A Stoffa
*Assistant Examiner* — Ray Alexander Dean
(74) *Attorney, Agent, or Firm* — Studebaker & Brackett PC

(57) ABSTRACT

Provided is a device for designed for use with a telescope having a primary mirror, such as a reflecting telescope, and to accurately analyzing the size of a step between paired regions of a plurality of mirror segments of the primary mirror. The device designed for use with a telescope whose primary mirror is composed of a plurality of mirror segments, and to analyze the size of a step between paired regions of the plurality of mirror segments comprises: a mask disposed in an optical axis of the primary mirror orthogonally to the optical axis at a given position where a plurality of mirror segment images as respective projected images of the plurality of mirror segments do not overlap each other, wherein a plurality of pairs of primary slits is formed at respective positions in the mirror segment images, wherein each of the primary slits are adjacent to a boundary (Continued)

between the paired regions of the mirror segment images and opposed and parallel to each other with a given spacing therebetween, and wherein at least one reference slit is arranged with respect to each of pairs of the primary slits in the mask, such that it extends at a given angle which is not parallel to each of the pairs of primary slits.

13 Claims, 22 Drawing Sheets

(51) Int. Cl.
    *G02B 5/10*     (2006.01)
    *G02B 7/183*     (2021.01)
    *G02B 23/16*     (2006.01)

FIG.13

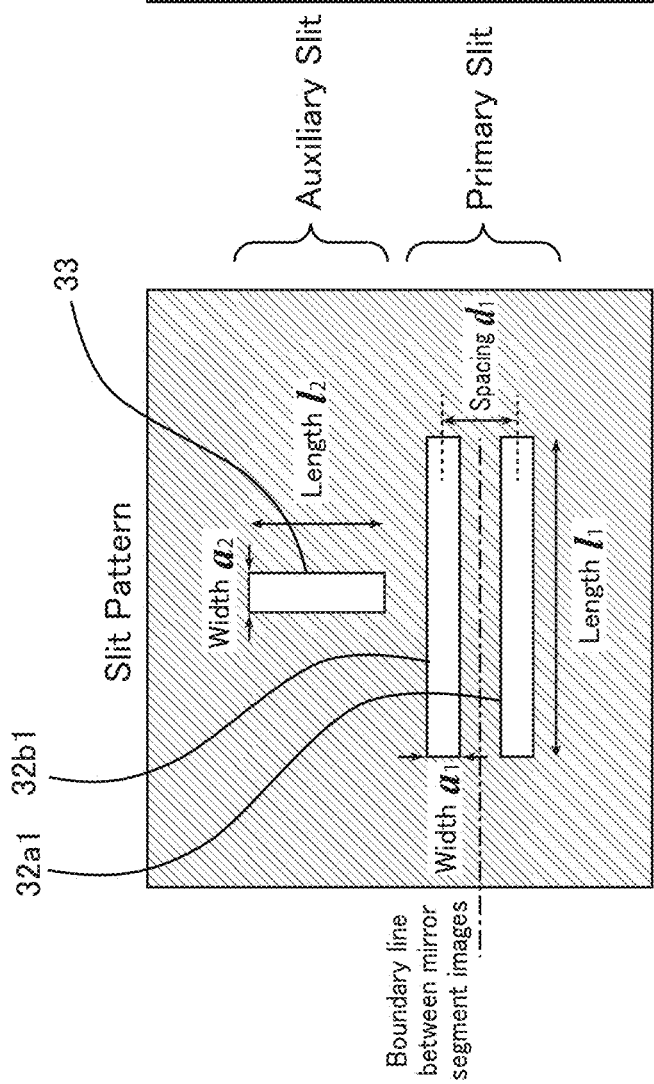

Width $a_n$ : determining viewable length of each diffraction pattern
Spacing $d_n$ : determining period of interference fringe
Length $l_n$ : exerting influence on lightness \* More commonly, a diffraction pattern is obtained by subjecting the slit pattern Fourier transformation (a)

Length of diffraction pattern of primary slits $\propto \dfrac{\lambda_0 F}{a_n}$ Period of interference fringe $\propto \dfrac{\lambda_0 F}{d_n}$ \* $\lambda_0$: center wavelength of light source
$F$: focal length of lens after slits (b)

FIG. 17
In case where mirror segment with auxiliary slits is tilted
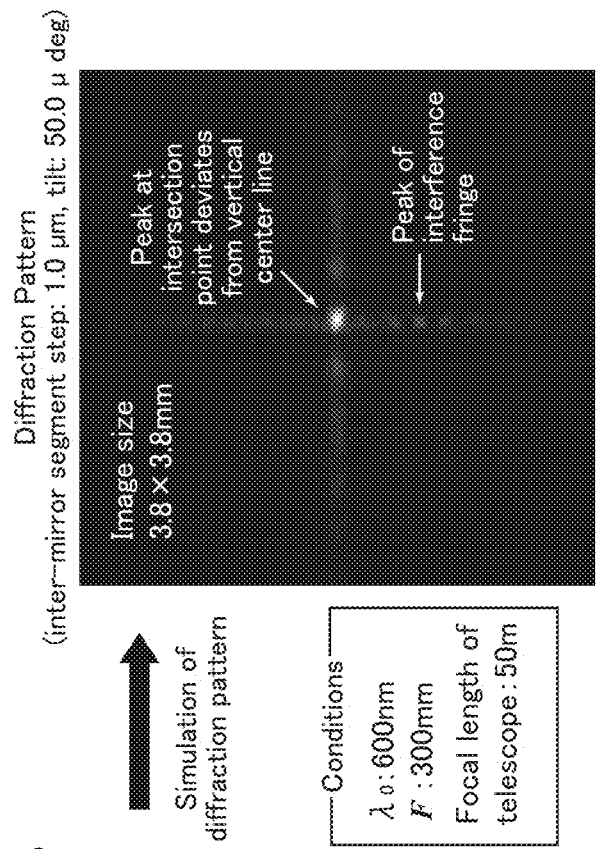
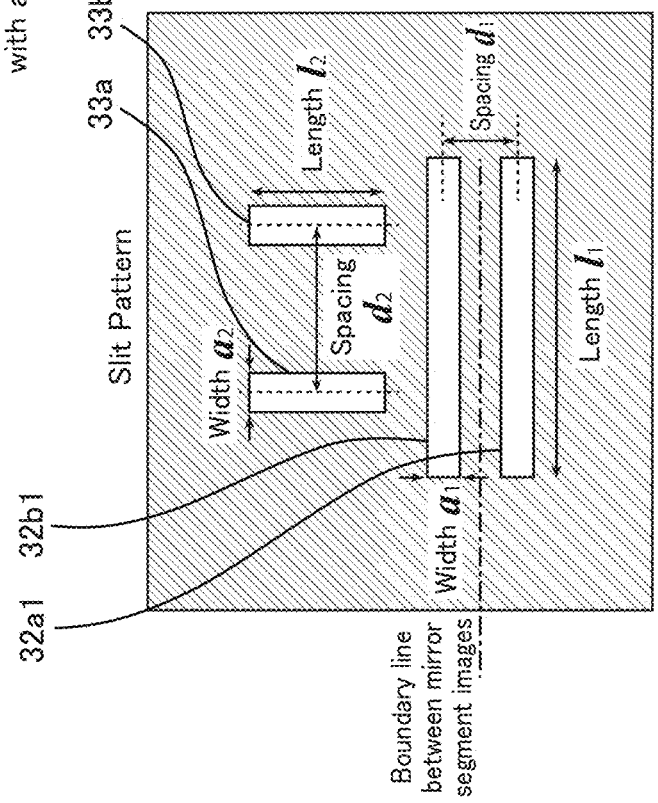
$a_1$ : 50 μm   $a_2$ : 40 μm
$d_1$ : 1.0mm   $d_2$ : 0.4mm
$l_1$ : 1.5mm   $l_2$ : 1.0mm
Length of diffraction pattern of primary slits : 3.8mm
Period of interference fringe of primary slits : 180 μm
Length of diffraction pattern of auxiliary slits : 1.9mm
Period of interference fringe of auxiliary slits : 450 μm FIG.21
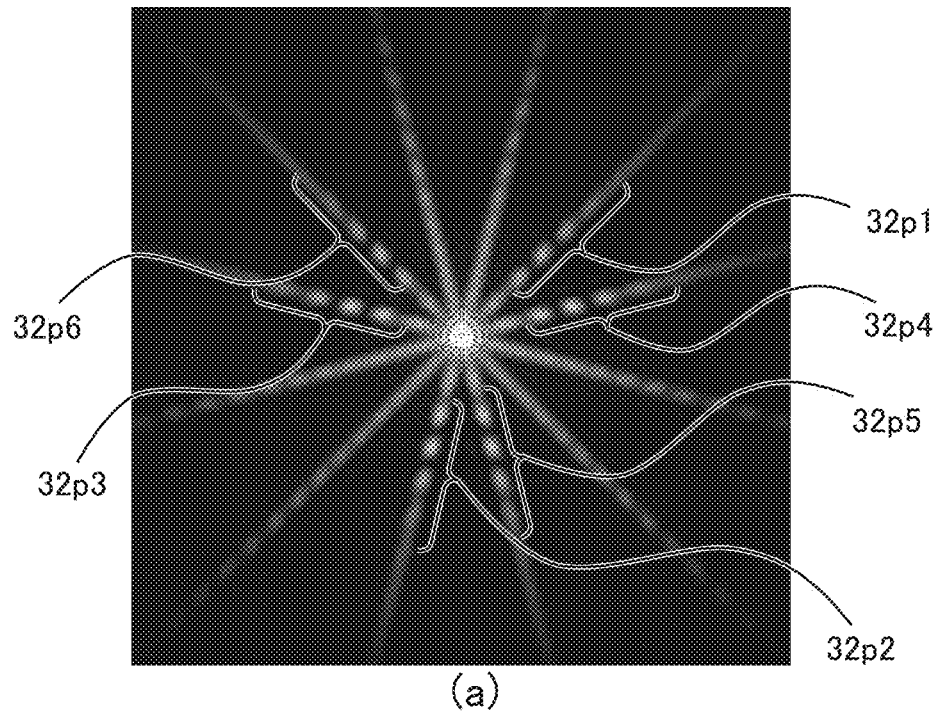
(a)
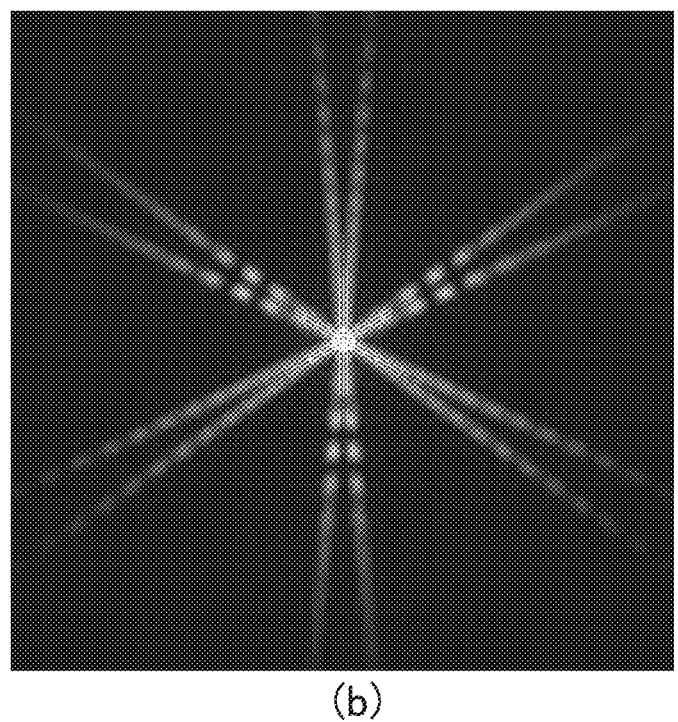
(b)

DEVICE FOR ANALYZING SIZE OF STEP IN PAIR OF DIVIDED MIRRORS OF TELESCOPE

TECHNICAL FIELD

The present invention relates to a device for analyzing the size (dimensions) of a step (axial position error) between paired regions of a plurality of mirror segments (pairs of a plurality of mirror segments) of a telescope, and more specifically to a device for analyzing the size of the step between the paired regions of the two mirror segments of the telescope by an interference fringe in a diffraction pattern produced by a slit group comprising an auxiliary slit.

BACKGROUND ART

In a telescope having a primary mirror such as a reflecting telescope used for astronomical observation, along with an increase in aperture, basic optical performance such as light-collecting power and resolving power become higher, and therefore it becomes possible to obtain a more detailed image of an observation target. However, a primary mirror having a large aperture involves a problem that manufacturing thereof is extremely difficult, and operation thereof is also difficult. For this reason, a segmented mirror-type reflecting telescope whose primary mirror is composed a plurality of mirror segments (segmented mirror) has been developed and used. In order to allow the plurality of mirror segments to bring out performance of the primary mirror in their entirety, the mirror segments after being assembled together need to be maintained in a similar shape to that of one primary mirror as much as possible so as to behave as one primary mirror. This requires reducing a deviation of each of the mirror segments from an ideal mirror surface, particularly a step between the mirror segments and a tilt of each of the mirror segment, as much as possible. Although each of the mirror segments has a mechanism for adjusting the position thereof in a direction of an optical axis and the tilt thereof with respect to the optical axis, it is necessary to adequately measure deviations of the position and tilt of each of the mirror segments and operate the mechanism to adjust and minimize the deviations. However, such a technique has not been matured, particularly, in the field of telescopes operated in orbit, such as a space telescope.

FIG. 1 is a diagram showing the overall configuration of a conventional reflecting telescope 1 to which the present invention will be applied. The present invention will be incorporated into and used in the reflecting telescope 1. The reflecting telescope 1 in this example is a reflecting telescope comprising a primary mirror and a secondary mirror whose optical axis is coincident with that of the primary mirror, such as Ritchey-Chretien telescope. Specifically, it has a primary optical system comprised of a primary mirror composed of a plurality of mirror segments 10, and a secondary mirror 20. It should be noted here that the present invention can be applied to not only the reflecting telescope but also a telescope which is a combination of a reflecting type and a refracting type, such as a Schmidt-Cassegrain telescope, etc., as long as they have a primary mirror. In the example illustrated in FIG. 1, each of the mirror segments 10 has a regular hexagonal shape, wherein six mirror segments 10 are arranged around a central mirror segment 10 in mutually side-opposed relation. FIG. 3 is a diagram showing the configuration of the mirror segments 10. In the reflecting telescope 1 in this example, each of the mirror segments 10 has a regular hexagonal shape, wherein six mirror segments 10a, 10b, 10c, 10d, 10e, 10f are arranged around a mirror segment 10 having an opening in a central region thereof, in mutually side-opposed relation, such that centers of the six mirror segments form a regular hexagonal shape. Here, when each of the mirror segments at respective positions is indicated individually, it is expressed by a reference sign with a suffix of lower-case letter, whereas, when each of the mirror segments is indicated generically, it is expressed by a reference sign devoid of such a suffix (this is also applied to the after-mentioned mirror segment images, slits, etc. In normal use of the reflecting telescope 1, an imaging lens system and/or a catoptric system are provided downstream of the primary optical system, thereby projecting an observation target image to an image sensor, although not illustrated in FIG. 1.

A technique of analyzing the size of a step in the mirror segments 10 includes: a filter method which comprises acquiring a plurality of PSF (point spread function) images each having a different wavelength to estimate the size of the step; a grating method which comprises diffracting a white PSF image by a grating (diffractive grating) disposed upstream of an imaging lens, and estimating the size of the step based on the obtained spectral image; and a slit interference method which comprises providing, at a pupil plane (conjugate plane), two slits, correspondingly to respective paired regions of the mirror segments which are subjected to measurement of the size of a step therebetween, and measuring the size of the step based on an interference fringe obtained from two slits. In the step analysis technique, a measurement time period, an influence of a mirror segmentation direction, measurement accuracy and beam utilization efficiency are important indexes of performance. Further, as the device configuration becomes simpler, e.g., by omitting a drive unit, it becomes more tough against changes in environment or aging. With regard to each of the above methods, these indexes will be described below. The filter method is characterized in that, although, due to the need to switch between filters during the measurement, the measurement time period is relatively long, and the beam utilization efficiency is not high, the measurement is independent of the segmentation direction of the primary mirror, and the measurement accuracy can be enhanced by increasing the number of filters. On the other hand, if the number of filters is increased to enhance the measurement accuracy, the device including a drive mechanism will undesirably increase in size. Thus, it becomes difficult to attain a tough configuration against changes in environment or aging. The grating method is characterized in that it provides a relatively short measurement time period, relatively high measurement accuracy, and relatively high beam utilization efficiency, although the measurement cannot be made under the condition that the segmentation direction of the primary mirror is orthogonal to a diffraction direction. The slit interference method is characterized in that it is shorter, in terms of the measurement timer period, than the filter method requiring mechanical switching of filters, and, differently from the grating method, the measurement can be made, irrespective of the segmentation direction of the primary mirror. However, since the slit interference method is configured to diffract source light by an elongate slit inserted in a light path, the beam utilization efficiency is not high. Further, since the slit interference method is based on a phenomenon that an interference fringe formed by diffracted light from two parallel slits is shifted along with the size of the step, it is possible to detect a step and estimate the size of the step, but the measurement accuracy is not so high, because there is difficulty in accurately determining an interference fringe position corresponding to zero step, as a measurement criterion. Here, in the slit interference method, the property that the beam utilization efficiency is not high can be improved by taking measures, such as increasing the measurement time period, or using a brighter light source.

Particularly, in ground-based observation, an above-ground object having strong light intensity can be targeted, so that a practical disadvantage is extremely mirror. Therefore, if the interference fringe position corresponding to zero step can be accurately determined, the slit interference method has a potential to become a step analysis method capable of enhancing the measurement accuracy, and attaining good performance in terms of all of the measurement time period, the influence of the mirror segmentation direction, the measurement accuracy and the beam utilization efficiency. Further, since the tilt of each mirror segment exerts an influence on a diffraction pattern, the slit interference method has a potential capable of detecting the tilt of each mirror segment. As a conventional technique, there is a method designed for use in a telescope comprising a primary mirror composed of a plurality of mirror segments, and to make a measurement of the mirror segments (Patent Document 1). In this conventional technique, a measurement of the position of each mirror segment is made by: using a polychromatic light source; inserting a mask having two openings in an optical axis; and measuring light passing through the openings. However, this conventional technique is not configured to be capable of accurately identifying the interference fringe position corresponding to zero step. Moreover, it is incapable of identifying the tilt of each mirror segment. Further, as an improvement of the conventional technique, there is a technique in which for parallel openings are provided in a mask, and a phase plate is inserted with respect to each of the openings, thereby improving measurement accuracy (Non-Patent Document 1). However, this technique is based on the premise of a monochromatic light source, and thereby a measurement range of the step is limited to a half-wave length or less. Moreover, even if multi-wavelength light source is employed, it is difficult to expand the measurement range, because a phase generally has a plate wavelength dependence. Further, this technique also requires determining the interference fringe position corresponding to zero step by additional means such as calibration, after all. Thus, the measurement accuracy cannot be maintained if there is environmental change. The present invention is intended to improve the conventional slit interference method to become capable of accurately determining the interference fringe position corresponding to zero step, and identifying the tilt of each mirror segment.

In the slit interference method, the reflecting telescope 1 comprises: the primary optical system comprising the plurality of mirror segments 10, and the secondary mirror 20; an imaging lens system (not illustrated); and a step analysis mechanism 11. The step analysis mechanism 11 comprises a mask 30 and a detector 40, wherein a diffraction pattern of light passing through the below-mentioned slits of the mask 30 is projected on the detector 40. More specifically, light entering the reflecting telescope 1 is blocked by the mask 30 provided in or just before the imaging lens system and formed with a pair of opposed slits as shown in FIG. 1, and diffraction patterns of respective light ray groups passing through the two slits are brought into interference with each other to generate a diffraction pattern 50 including an interference fringe, on the detector 40 which is an imaging plane. A maximum intensity point of the interference fringe (hereinafter referred to as "peak of the interference fringe") is positionally shifted according to the size of a step between paired regions of the mirror segments 10. Thus, the size of the step between the two mirror segments 10 can be analyzed from the position of the peak of the interference fringe. A portion of the interference fringe where phases are aligned to cause an increase in intensity (and a portion where phases are inverted to cause a decrease in intensity) is shifted according to a change in size of a wavelength-order step, so that it becomes possible to analyze the presence of a wavelength-order step. FIG. 1 shows, in the right region thereof, that a pair of slits are formed in a circular mask 30 in a pattern in which they are arranged at respective positions adjacent and parallel to opposed two sides in paired regions of a plurality of mirror segment images corresponding to paired regions of the plurality of mirror segments 10, wherein the mirror segment images are illustrated only by a number of three as an example. In this way, the pair of slits are formed, respectively, in the paired regions of the two mirror segment images corresponding to the paired regions of the two mirror segments 10, at respective positions adjacent and parallel to the opposed sides of the two mirror segment images. FIG. 1 also shows, in the lower right region thereof, that the position of the diffraction pattern 50 is shifted according to the size of the step. Three images of the diffraction pattern 50 in FIG. 1 show, respectively, three cases where the size of the step is 150 nm, 450 nm, and 1 μm. As the step becomes larger, the peak of the interference fringe indicated by the arrowed line in FIG. 1 is shifted upwardly. In the slit interference method, the size of the step is analyzed by detecting such a shift amount. However, due to the absence of another pattern serving as a criterion of the shift amount in an up-down direction (direction along which the diffraction pattern extends), other than the diffraction pattern 50, it is difficult to accurately identify the shift amount of the diffraction pattern 50. Thus, it is also difficult to accurately measure the size of the step.

CITATION LIST

Parent Document

Patent Document 1: U.S. Pat. No. 5,146,072

Non-Patent Document

Non-Patent Document 1: Alan Wertheimer and one other author, "High-accuracy white-light optical piston sensor for segmented optics", 104/Proceedings of SPIE Vol. 1755 Interferometry: Techniques and Analysis, The International Society for Optical Engineering, Feb. 5, 1993

SUMMARY OF INVENTION

Technical Problem

As mentioned above, in the conventional slit interference method, there is no up-down directional criterion for identifying the shift amount of the peak of the interference fringe. The diffraction pattern having the interference fringe is a single straight line. Thus, when it is shifted in the up-down direction, it is difficult to accurately detect the shift amount. Although it is possible to some extent to identify how much the peak of the interference fringe is shifted, based on an absolute position on the detector 40, it is difficult to accurately identify the shift amount, because an interference fringe generation position varies due to various factors such as thermal environment and vibration. As above, in the slit interference method, there has been a problem of difficulty in accurately measuring the position of the interference fringe, and difficulty in performing adjustment to reduce the step between the mirror segments. The present invention is intended to solve such a problem by generating another diffraction pattern usable as a criterion of the shift amount of the peak of the interference fringe included in the diffraction pattern.

Solution to Technical Problem

The present invention provides a device designed for use with a telescope whose primary mirror is composed of a plurality of mirror segments, and to analyze a size of a step between paired regions of the plurality of mirror segments. The device comprises a mask disposed in an optical axis of the primary mirror orthogonally to the optical axis at a given position where a plurality of mirror segment images as respective projected images of the plurality of mirror segments do not overlap each other, wherein a plurality of primary slits is formed at respective positions in the mirror segment images, each of the primary slits being adjacent to a boundary between the paired regions of the mirror segment images and being opposed and parallel to each other with a given spacing therebetween, wherein at least one reference slit is arranged with respect to each of pairs of the primary slits in the mask to extend at a given angle therefrom. The reference slit may be an auxiliary slit which is formed at a position adjacent to one of the pair of primary slits, to extend at a given angle with respect to the pair of primary slits. Alternatively, the reference slit may be composed of another primary slit disposed along another boundary adjacent to the boundary along which the pair of primary slits are arranged.

The auxiliary slit may have a right angle with respect to the pair of primary slits. The auxiliary slit may be composed of a pair of mutually-parallel slits. The pair of primary slits may be formed along the boundary between the paired regions of the two mirror segment images, and the reference slit may be composed of another primary slit disposed along another boundary adjacent to the boundary along which the pair of primary slits are arranged.

Each of the pair of primary slits may be formed to extend at a given angle which is not parallel to the boundary between the paired regions of the two mirror segment images, and the reference slit may be composed of another primary slit disposed to extend at a given angle which is not parallel to another boundary other than and adjacent to the boundary along which the pair of primary slits are arranged. In this case, the plurality of pairs of primary slits may be arranged such that directions thereof intersect with each other at different angles, or intersect with each other at integral multiples of a unit angle.

The present invention also provides a device designed for use with a telescope whose primary mirror is composed of a plurality of mirror segments separated from each other, and to analyze a size of a step between paired regions of the plurality of mirror segments. The device comprises: a mask disposed in an optical axis of the primary mirror orthogonally to the optical axis at a given position where a plurality of mirror segment images as respective projected images of the plurality of mirror segments do not overlap each other, wherein a plurality of primary slits is formed at respective positions in the mirror segment images, each of the primary slits being arranged parallel to each other with a given transverse distance therebetween while being spaced apart from each other by a given longitudinal distance.

The given position where the plurality of mirror segment images do not overlap each other may be at a pupil plane of the telescope. The device of the present invention may comprise a focal plane mask having a pinhole for allowing light focused at a center of a focal plane of the primary mirror to pass therethrough. The device of the present invention may further comprise an imaging lens system comprising an array of lenses arranged correspondingly to respective intersection points between corresponding ones of center lines of the plurality of pairs of primary slits and center lines of the reference slits.

The present invention further provides a method designed for use in a telescope whose primary mirror is composed of a plurality of mirror segments, and to eliminate a step between paired regions of the plurality of mirror segments, using the above device in which the auxiliary slit is composed of a pair of mutually-parallel slits. The method comprises the steps of: acquiring, by a detector, an image of diffraction patterns generated by the pair of primary slits and the pair of auxiliary slits; adjusting the step between the paired region of the two mirror segments such that a peak of an interference fringe in the diffraction pattern of the pair of primary slits comes to an intersection point between the diffraction patterns; and adjusting an angle of tilt of each of the mirror segments such that a peak in the intersection point between the diffraction pattern of the pair of auxiliary slits and the diffraction pattern of the pair of primary slits comes on a center line of the diffraction pattern of the pair of primary slits.

Effect of Invention

In the present invention, the reference slit extending at a given angle which is not parallel to the pair of primary slits is provided in the mask disposed orthogonally to the optical axis at a given position where the plurality of mirror segment images do not overlap each other, and the diffraction pattern from the reference slit is superimposed on the diffraction pattern from the pair of primary slits to form an intersection therebetween to serve as a criterion for identifying the shift amount of an interference fringe in the diffraction pattern of the pair of primary slits, based on the peak of the interference fringe, thereby providing an advantageous effect of being able to accurately identify the shift amount of the interference fringe, and accurately derive the step between the mirror segments. In a case where the reference slit is composed of two auxiliary slits, an interference fringe is also generated in a diffraction pattern from the auxiliary slits to form a maximum intensity point thereof in an intersection point with the diffraction pattern of the pair of primary slits (hereinafter referred to as "peak in the intersection point"), thereby providing an advantageous effect of being able to identify a deviation of the peak in the intersection point, from a center line of the diffraction pattern of the pair of primary slits, i.e., a deviation of the diffraction pattern of the auxiliary slits, and accurately derive the tilt of each of the mirror segments. In the case where the reference slit is composed of another primary slit, the present invention can also provide an advantageous effect of being able to reduce the total number of slits, and reduce the number of intersection points of the diffraction patterns to be observed. In the case where the reference slit is composed of another primary slit, and all of the pairs of primary slits are arranged such that directions thereof intersect with each other at different angles, the present invention can also provide an advantageous effect of being able to prevent the diffraction patterns (interference fringes) from the plurality of pairs of primary slits from overlapping each other. In the case where each of the pairs of primary slits are arranged parallel to each other with a given transverse distance therebetween while being spaced apart from each other by a given longitudinal distance, in respective paired regions of the plurality of mirror segment images corresponding to the paired regions of the mirror segments, wherein the reference slit for a certain primary slit is composed of another primary slit, the present invention can provide an advantageous effect of being able to, even in the situation where the mirror segments are arranged separately from each other, generate an interference pattern having an interference fringe from the paired regions of the mirror segments to form a peak of the interference fringe, thereby accurately identifying the shift amount of the interference fringe, and accurately deriving the step between the mirror segments.

BRIEF DESCRIPTION OF DRAWINGS

FIG. 13 is a diagram showing a design example of slits and an example of a resulting diffraction pattern (in the case where the number of auxiliary slits is one).

FIG. 17 is a diagram showing a specific design example of slits and an example of a resulting diffraction pattern (in the case where the number of auxiliary slits is two, and there is a tilt in a primary mirror).

FIG. 21 is a diagram showing an example of a diffraction pattern of a pair of rotated primary slit pair.

DESCRIPTION OF EMBODIMENTS (Concept of Present Invention)

Figure 1:
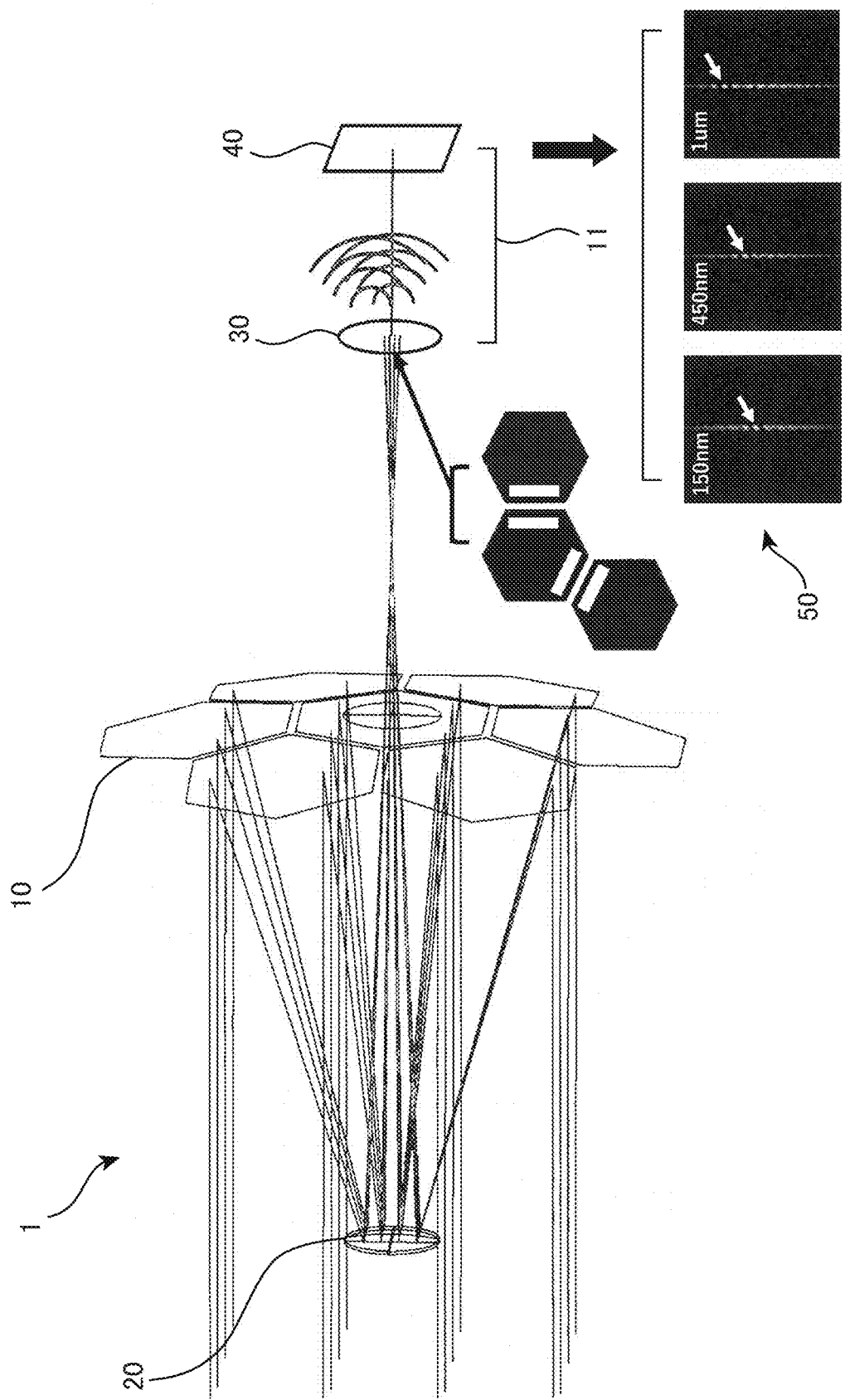
FIG. 1 is a diagram showing the overall configuration of a conventional reflecting telescope 1.
Figure 2:
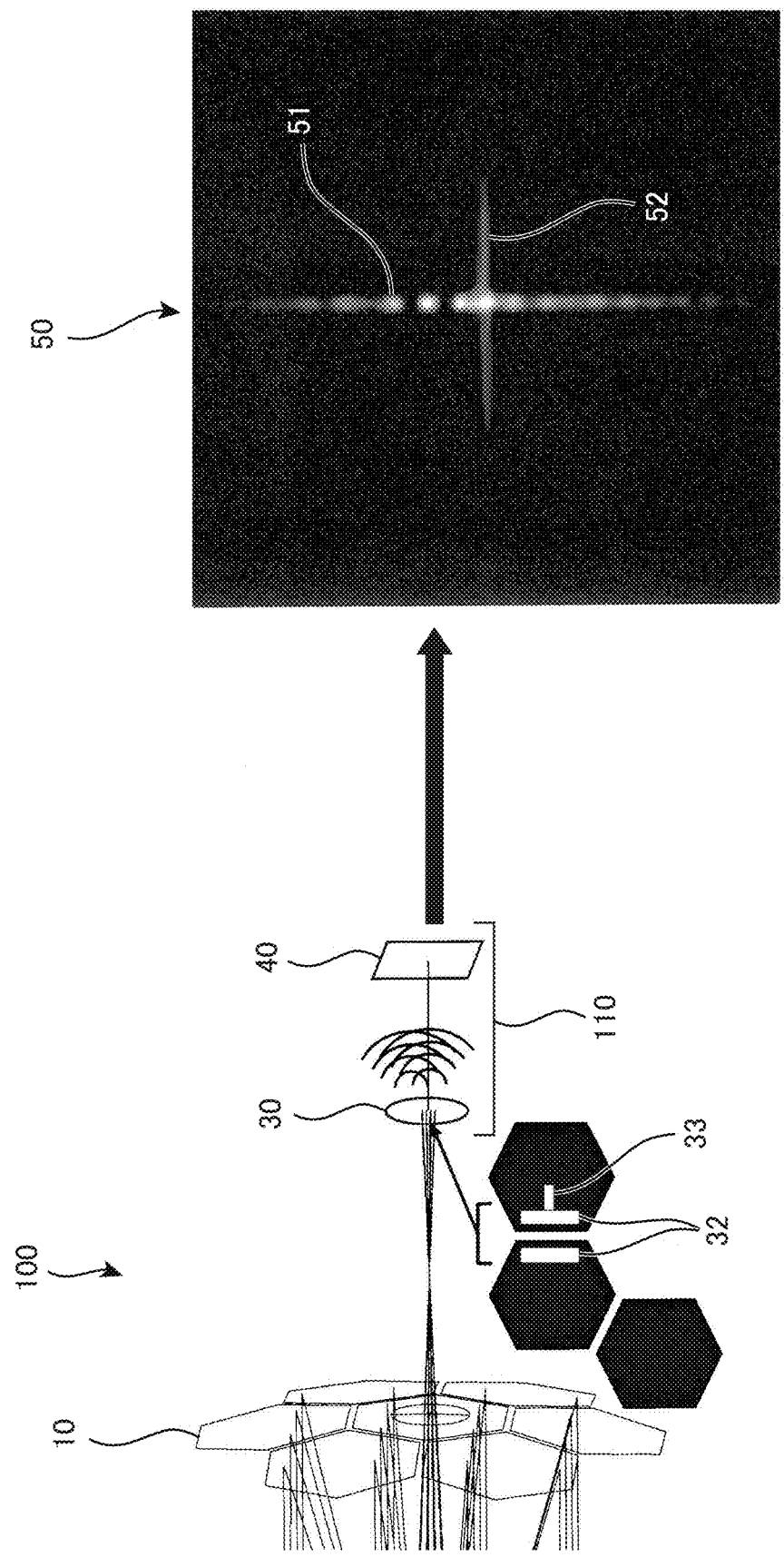
FIG. 2 is a diagram showing the concept of the present invention applied to a reflecting telescope 100.
Figure 3:
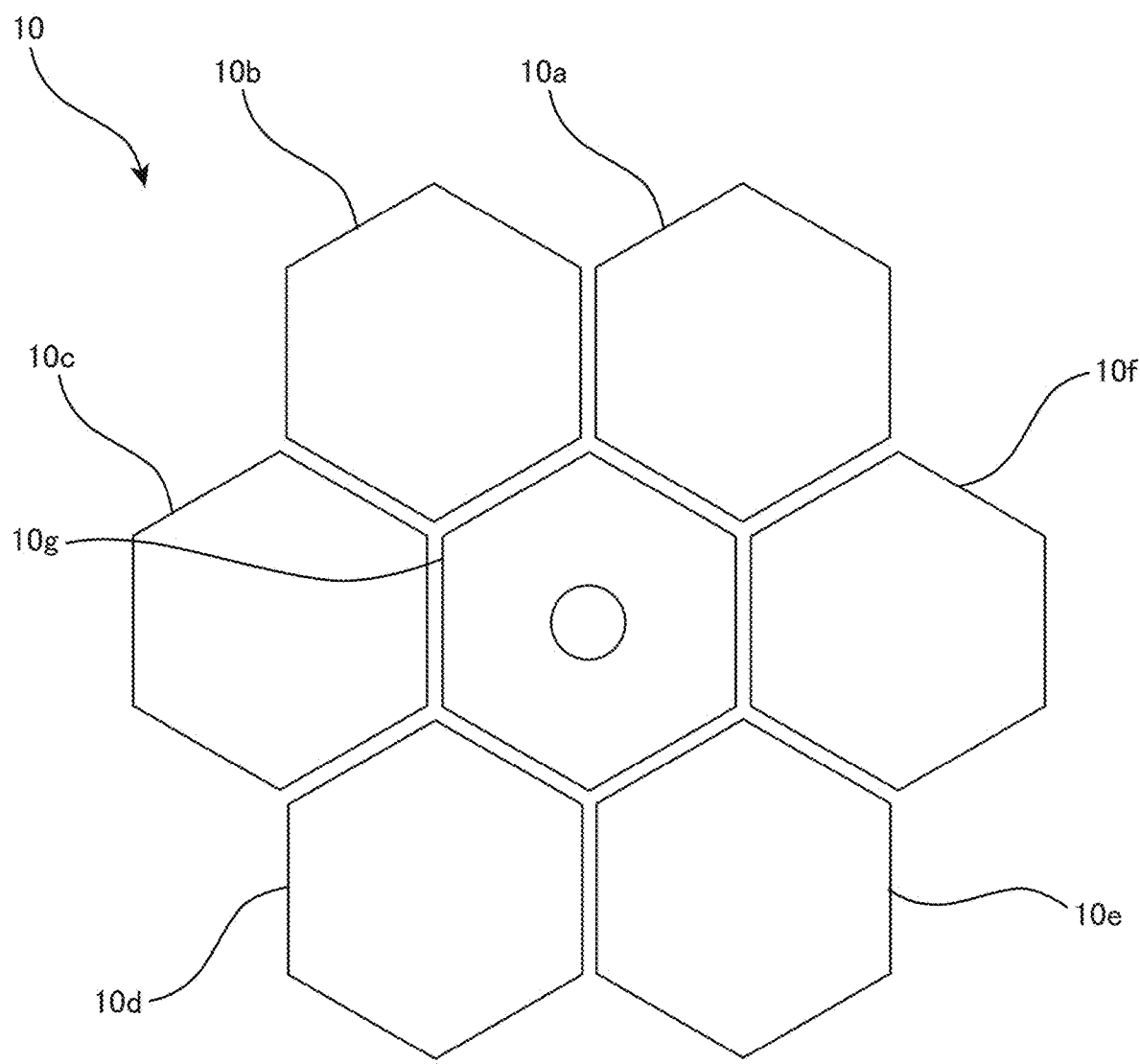
FIG. 3 is a diagram showing the configuration of a mirror segment 10.

FIG. 2 is a diagram showing the concept of the present invention. A reflecting telescope 100 is of a type in which a step analysis mechanism according to the present invention is incorporated into the conventional reflecting telescope 1. The reflecting telescope 100 comprises: a primary optical system comprising a primary optical system composed of a plurality of mirror segments 10, and a secondary mirror 20 (which are illustrated in FIG. 1); an imaging lens system (not illustrated); and a step analysis mechanism 110. The mirror segments 10 in this embodiment have the configuration illustrated in FIG. 3. The step analysis mechanism 110 comprises a mask 30 and a detector 40, wherein diffraction patterns of respective light ray groups passing through the below-mentioned slits of the mask 30 are projected onto the detector 40. Here, a diffraction pattern is generated such that it spreads in a direction orthogonal to a slit. FIG. 2 shows that a pair of primary slits 32 are formed in a circular mask 30 in a pattern in which they are arranged at respective positions adjacent and parallel to opposed two sides in paired regions of a plurality of mirror segment images corresponding to paired regions of the plurality of mirror segments 10, and an auxiliary slit 33 is formed in the region of the mirror segment image in which a right one of the pair of primary slits 32 is located, at a position adjacent to the right primary slit 32, wherein the mirror segment images are illustrated only by a number of three as an example. FIG. 2 shows, in the right region thereof, two diffraction patterns formed by light passing through these slits of the mask 30. One diffraction pattern 51 is a diffraction pattern of the pair of primary slits 32, in which an interference fringe is formed. The other diffraction pattern 52 is a diffraction pattern of the auxiliary slit 33, which orthogonally intersects with the diffraction pattern 51 to form an intersection point. In this way, an extra diffraction pattern which intersects with the diffraction pattern of the pair of primary slits 32 to form an intersection point is provided, so that it is possible to accurately identify the shift amount of the interference fringe in the diffraction pattern of the pair of primary slits 32, by using the intersection point as a criterion. A slit producing a diffraction pattern capable of forming an intersection point serving as a criterion will hereinafter be referred to as "reference slit". The auxiliary slit 33 is one example of the reference slit. The size of a step between paired regions of the mirror segments 10 can be accurately derived by accurately identifying the shift amount of the interference fringe in the diffraction pattern. Since a diffraction pattern and an interference fringe are generated such that they spread in a direction orthogonal to a slit, the diffraction pattern 51 of the pair of primary slits 32 depicted such that it is oriented in an up-down direction in FIG. 2 actually spreads laterally. The same is also applied to a relationship between the auxiliary slit 33 and the diffraction pattern 52 therefrom.

(Configuration of Present Invention)

Figure 4:
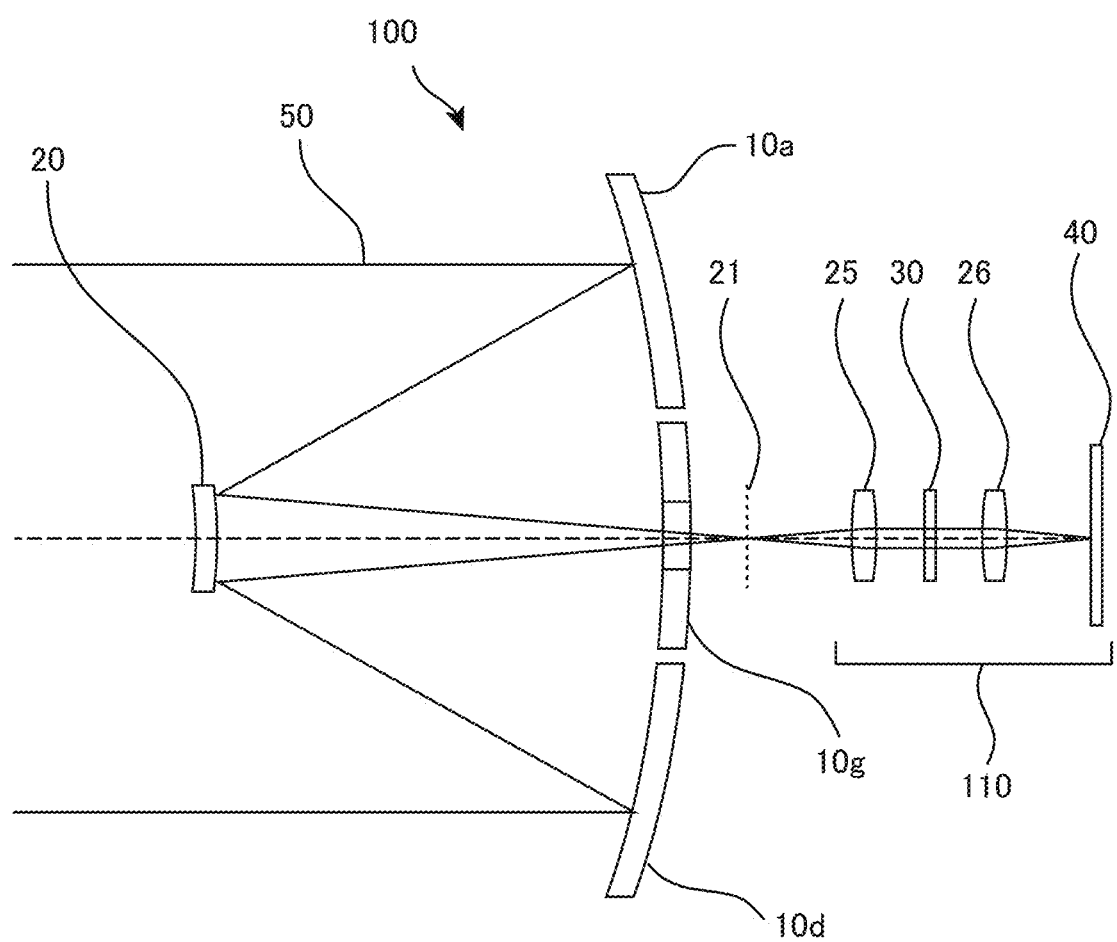
FIG. 4 is a fragmentary side view showing the configuration of an optical system of the reflecting telescope 100 (in a case where a mask 30 is disposed at a pupil plane).

With reference to the drawings, the configuration of a device according to the present invention will now be described. FIG. 4 is a fragmentary side view showing the configuration of an optical system of the reflecting telescope 100. FIG. 4 shows one example where the mask 30 is disposed at a pupil plane. First of all, this configuration will be described. Light incident on the reflecting telescope 100 is blocked by the mask 30 provided in or just before the imaging lens system and formed with the slits, and diffraction rays of light passing through the pair of opposed slits are brought into interference with each other to generate the diffraction pattern 50 on the detector 40 which is an imaging plane. The detector 40 may be composed of an image sensor such as a CCD image sensor or a CMOS image sensor. It is disposed downstream of the mask 30 to allow an optical image to be projected thereonto and observed as the diffraction patterns and the interference fringe. Typically, the mask 30 is a circular plate made of metal or resin and formed with the slits.

The mask 30 is disposed in an optical axis of a primary mirror orthogonally to the optical axis at a given position where a plurality of mirror segment images as respective projected images of the plurality of mirror segments 10 do not overlap each other. The mask 30 may be disposed at a position where mirror segment images of the mirror segments themselves exist, when viewed from the side of the imaging lens system, i.e., at a pupil plane. When the mask 30 is disposed at such a position, light going through the mirror segments 10 forms mirror segment images which are images of the mirror segments 10 themselves, such that the mirror segment images do not overlap each other on the mask 30. Thus, by providing a slit in the mask 30 at a position within the mirror segment image corresponding to each of the mirror segments 10, it becomes possible to allow only light from one of the mirror segments to pass through the slit.

Figure 5:
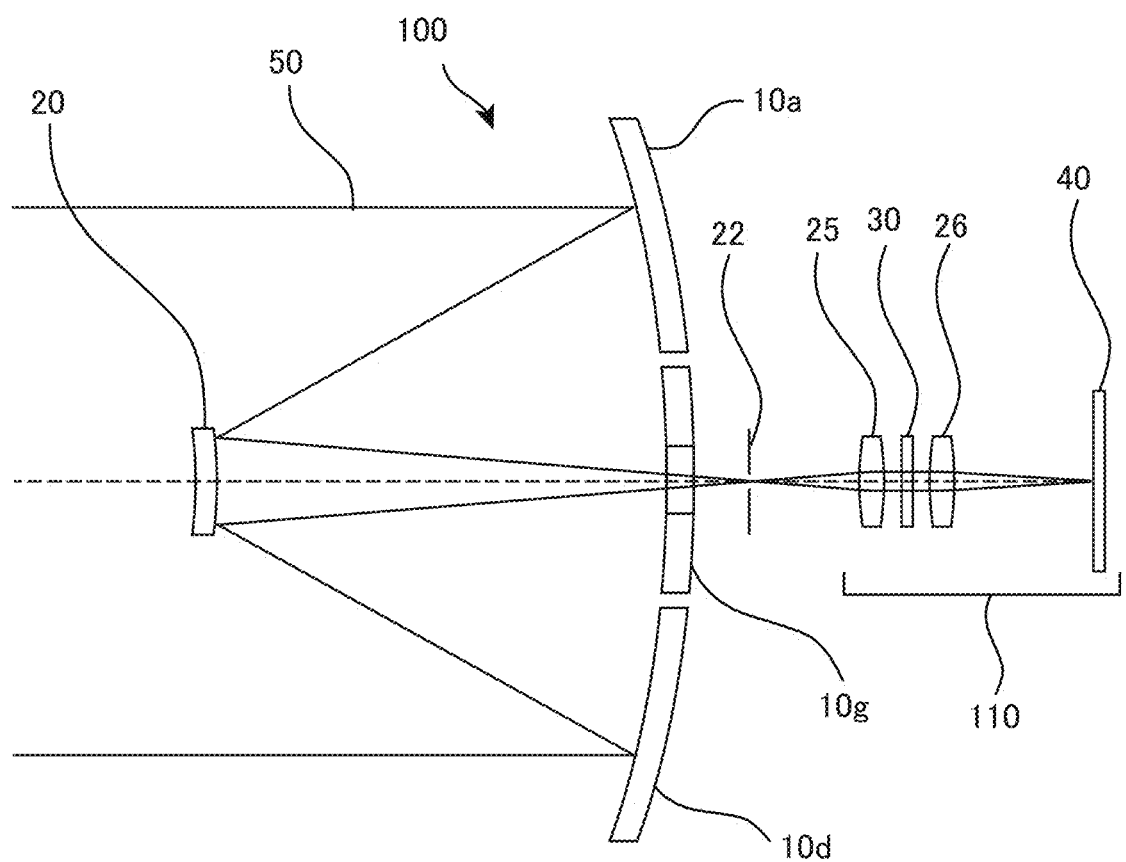
FIG. 5 is a fragmentary side view showing the configuration of an optical system of the reflecting telescope 100 (in a case where a focal point mask having a pinhole is disposed at a focal plane).

Instead of disposing the mask 30 at the pupil plane, a focal point mask 22 with a pinhole for allowing only light focused at a given position such as a central region thereof to pass therethrough may be placed at a focal position of the mirror segments 10, and the mask 30 may be placed at an appropriate position downstream of the focal point mask 22. FIG. 5 is a fragmentary side view showing the configuration of an optical system of the reflecting telescope 100 in the case where the focal point mask 22 having the pinhole is disposed at a focal plane. In this case, a plurality of light ray groups each going through a respective one of the mirror segments 10 never overlap each other after passing through the focal point mask 22, so that, even if the mask 30 is disposed at any position downstream of the focal point mask 22, mirror segment images as respective projected images of the mirror segments 10 never overlap each other. In FIGS. 4 and 5, a two-mirror telescope is shown as an example. Alternatively, a three or more-mirror telescope may be used. In a three-mirror type telescope, since there is a pupil plane in, e.g., a Korsch optical system of the telescope (between a third mirror and an image plane), the mask having the slits may be provided thereat. In this case, no imaging lens is needed.

Return to FIG. 4. A focal plane 21 is a virtual plane existing at a focal point of the mirror segments 10, wherein an image of an object located at infinity is formed thereat. In the example illustrated in FIG. 4, there is no need to dispose some kind of configuration at the focal plane 21. The imaging lens system is composed of a lens 25 and a lens 26. In a state in which the object is being observed (in a state in which the mask 30 is removed), the image of the object existing at the focal plane 21 is projected onto the detector 40 via the imaging lens system. That is, the imaging lens system is configured to allow the image existing at the focal plane 21 to be formed on the detector 40. The step analysis mechanism 110 is composed of the mask 30 and the detector 40, and used in a state in which the mask 30 and the detector 40 are arranged at respective appropriate positions with respect to the imaging lens system. In this example, the mask 30 is disposed at a pupil plane existing between the lens 25 and the lens 26. Diffraction patterns of light passing through the slits of the mask 30 are projected onto the detector 40. Here, during normal observation during which no step analysis is performed, the reflecting telescope 100 is used in a configuration devoid of the mask 30 of the step analysis mechanism 110, wherein light from an observation target is focused to form an image at a focal point of a primary optical system, and this image is observed while being projected onto the detector 40 via the imaging lens system. Then, the mask 30 is disposed within the optical axis of the primary mirror at the given position where the mirror segment images as respective projected images of the mirror segments 10 do not overlap each other, thereby constituting the step analysis mechanism 110. In this process, it is possible to adjust the configuration and position of the imaging lens system, the position of the detector 40, etc., as needed. Alternatively, the observation imaging lens system of the reflecting telescope 100 may be replaced with a step-analysis imaging lens system incorporating the mask 30, and this step-analysis imaging lens system may be combined with the detector 40 to form the step analysis mechanism 110. Alternatively, the reflecting telescope may be configured such that a light path is branched by a half mirror or the like, so as to allow an optical system for the normal observation and an optical system for the step analysis to be used concurrently.

In the example illustrated in FIG. 5, the focal point mask 22 is disposed at the focal plane of the primary mirror. By providing the focal point mask 22 for allowing only light at a center thereof on the optical axis to pass therethrough, the mirror segment images free from overlapping each other are formed just after the light becomes parallel light through the lens 25. Thus, the mask 30 can be disposed at an appropriate position downstream of the lens 25, and a distance between the lens 25 and the lens 26 can be narrowed.

(Primary Slits)

Figure 6:
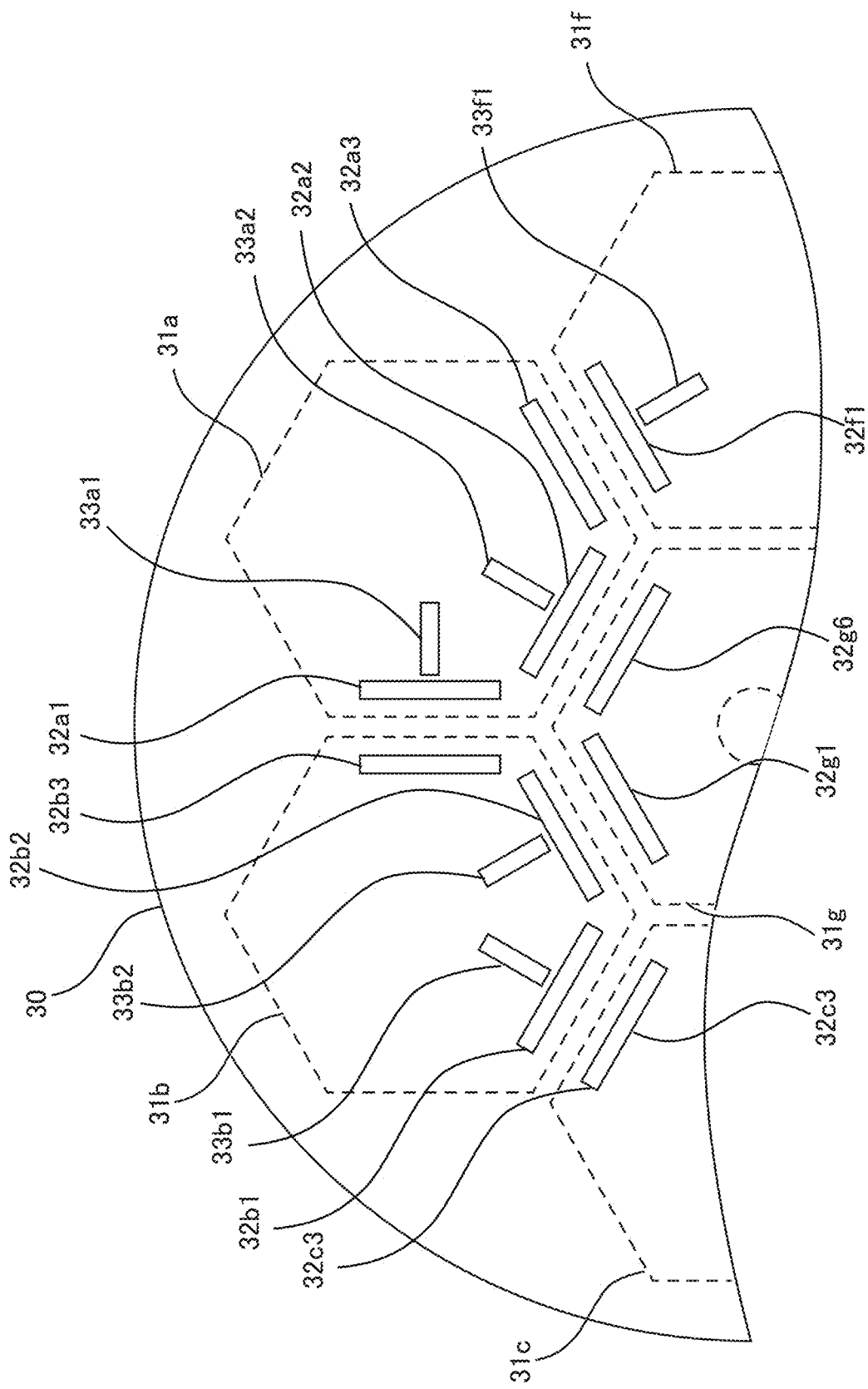
FIG. 6 is a diagram enlargedly showing an example of the arrangement of slits on the mask 30 (in a case where the number of auxiliary slits is one).

FIG. 6 is a diagram enlargedly showing an example of the arrangement of slits on the mask 30, in a case where the number of auxiliary slits is one per the pair of primary slits. With reference to FIG. 6, the configuration of the pair of primary slits will be described. A plurality of pairs of primary slits 32 are formed in the mask 30, such that each of the pairs of primary slits 32 are arranged opposed and parallel to each other with a given spacing therebetween, in respective paired regions of (within the range of) the plurality of mirror segment images corresponding to the paired regions of the plurality of mirror segments 10, at respective positions adjacent to and along a boundary between the paired regions of the two mirror segment images. It should be noted here that, although the pair of primary slits 32 in this embodiment are arranged along (parallel to) the boundary, the pair of primary slits 32 need not necessarily be arranged along the boundary as long as the pair of primary slits 32 are arranged parallel to each other. Here, the term "boundary" means a center line between opposed two sides of any opposed two of the plurality of mirror segment images. Arranging a pair of slits in respective paired regions of any adjacent two of the plurality of mirror segment images, at respective positions adjacent to the boundary between the paired regions of the two mirror segment images is equivalent to arranging a pair of slits in respective paired regions of any adjacent two of the plurality of mirror segment images, at respective positions adjacent to the opposed sides of the two mirror segment images. In this way, the pair of primary slits 32 opposed to each other across the boundary are formed. The pair of opposed primary slits 32 are arranged with a given spacing therebetween. Here, the term "spacing" is equivalent to the length of a perpendicular line connecting two straight lines each of which extends parallel to two long sides of a respective one of the pair of primary slits 32 and passes through the center of the respective one of the pair of primary slits 32, i.e., to a length corresponding to a "distance" between parallel lines consisting of the two straight lines. The "spacing" can also be expressed as a "transverse distance" because it is a distance in a direction transversely crossing parallel lines. On the other hand, in the after-mentioned distributed primary slit pair in which a pair of primary slits are not arranged opposed to each other, but spaced apart from each other in a direction parallel to the primary slits, a spaced-apart distance in the direction parallel to the primary slits will hereinafter be referred to as "longitudinal distance". In the distributed primary slit pair, in order to avoid confusion between the "spacing" and the "longitudinal distance", the "spacing" will be expressed as the "transverse distance". Preferably, each of the pair of primary slits 32 has the same length and the same width. In a case of each of the mirror segments 10 has a hexagonal shape, opposed two sides of hexagonal mirror segment images corresponding to the mirror segments 10 are approximately located at a boundary therebetween. Thus, a pair of primary slits 32 each parallel to a respective one of the sides are arranged at respective positions adjacent to the sides. In FIG. 6, mirror segment images 31*a*, 31*b*, 31*c*, 31*f* corresponding, respectively, to four mirror segments 10*a*, 10*b*, 10*c*, 10*f* are indicated by the broken lines. Each of the primary slits 32 is formed along a boundary between respective two of the mirror segment images, i.e., along the side of each hexagonal shape. In a case where the mirror segments comprise a circular-shaped mirror segment and a ring-shaped mirror segment surrounding the circular-shaped mirror segment, a boundary between the circular-shaped and ring-shaped mirror segments is formed as a curved line. In this case, each of the primary slits 32 may be formed to extend in a direction of tangent to the curved line. By forming the pair of primary slits 32 in the above manner, it becomes possible to allow two light ray groups from two of the mirror segments 10 to pass through respective specific ones of the pair of primary slits 32, so as to cause diffraction patterns of the light ray groups spread by diffraction after passing through respective ones of the pair of primary slits 32, to interfere with each other, thereby generating an interference pattern like an interference fringe. The interference fringe is positionally shifted according to the size of a step between paired regions of the two mirror segments 10. Thus, the shift amount of the interference fringe can be accurately identified by observing the position of a peak of the interference fringe. Here, the period of the interference fringe is inversely proportional to the spacing between the pair of primary slits 32, as described in the after-mentioned design example of slits. For this reason, if the given spacing between the pair of primary slits 32 is excessively large, the period of the interference fringe is excessively shortened, and thereby the interference fringe becomes unclear, leading to difficulty in making an observation thereof and in identifying the shift amount of the interference fringe. Thus, in order to produce a clear interference fringe enough to allow for observation thereof, the given spacing between the pair of parallel primary slits 32 needs to be set to a small appropriate value (e.g., about 1 mm).

(Rotated Primary Slit Pair)

Figure 20:
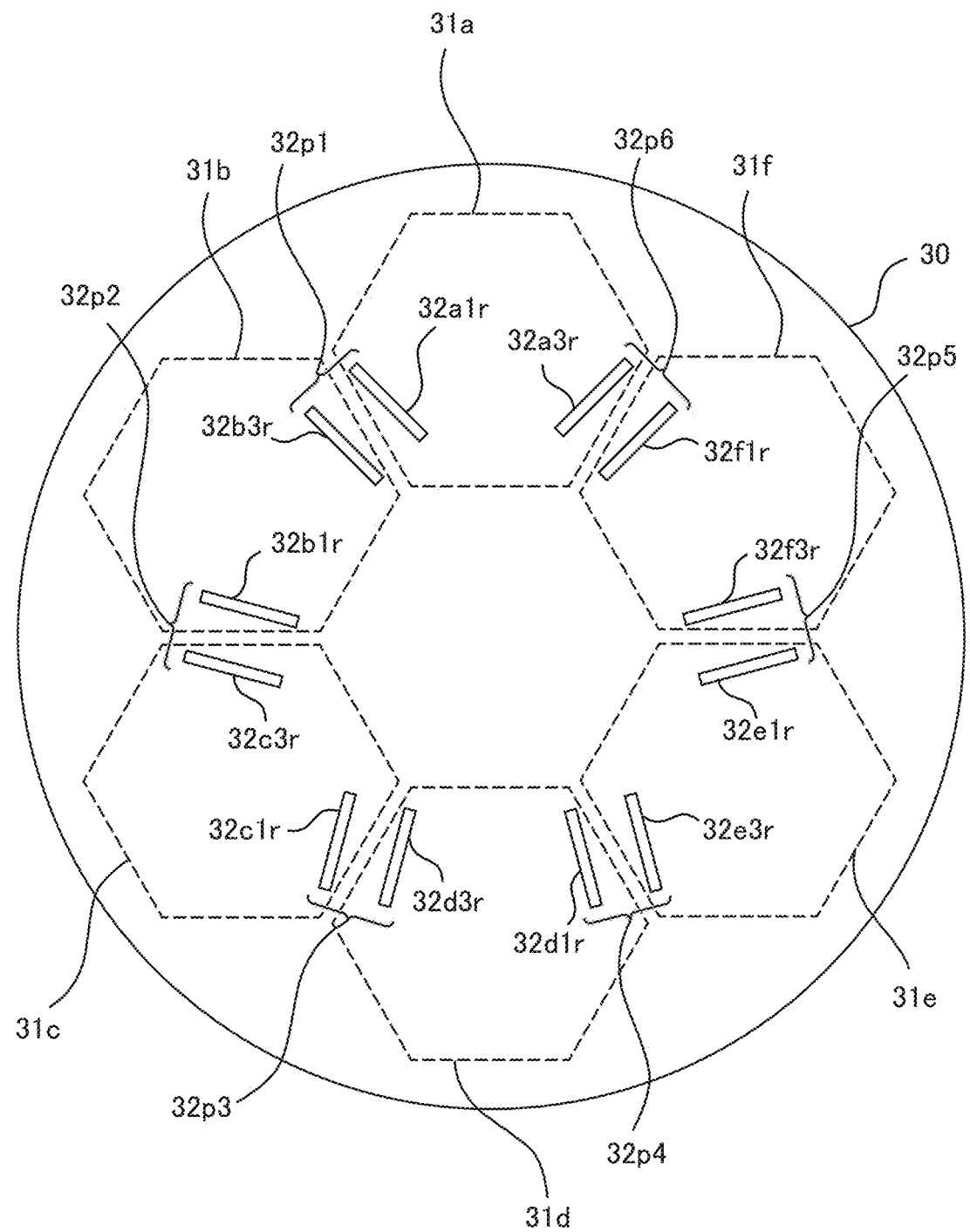
FIG. 20 is a diagram showing an example of the arrangement of slits on the mask 30 (rotated primary slit pair).

Each of the pair of primary slits 32 is typically disposed along (parallel to) a respective one of opposed two sides of two of the plurality of mirror segment images (or along the boundary between the two mirror segment images), so that the pair of primary slits 32 are arranged parallel to each other. However, considering that, as long as the pair of primary slits 32 are parallel to each other, it is possible to obtain an interference pattern from two light ray groups each passing through a respective one of the pair of primary slits 32, the pair of primary slits 32 need not necessarily be parallel to the opposed sides of the two mirror segment images (or the boundary between the two mirror segment images). Such a pair of primary slits 32 each formed to extend at a given angle which is not parallel to the opposed sides of the two mirror segment images (or the boundary between the two mirror segment images) will hereinafter be referred to as "rotated primary slit pair". In the rotated primary slit pair, the plurality of pairs of primary slits 32 may be arranged in non-parallel relation to each other. In this case, it is possible to obtain a plurality of diffraction patterns such that all of them are separated from each other in an angular direction. FIG. 20 shows one example of the arrangement of a plurality of rotated primary slit pairs. A reference slit for a certain rotated primary slit pair is composed of another rotated primary slit pair formed adjacent to another boundary different from a boundary around which the certain rotated primary slit pair is arranged, such that it extends at a given angle which is not parallel to the another boundary. The pair of primary slits 32 parallel to the opposite sides of the two mirror segment images can be deemed to be one particular example of the rotated primary slit pair.

(Distributed Primary Slit Pair)

Figure 22:
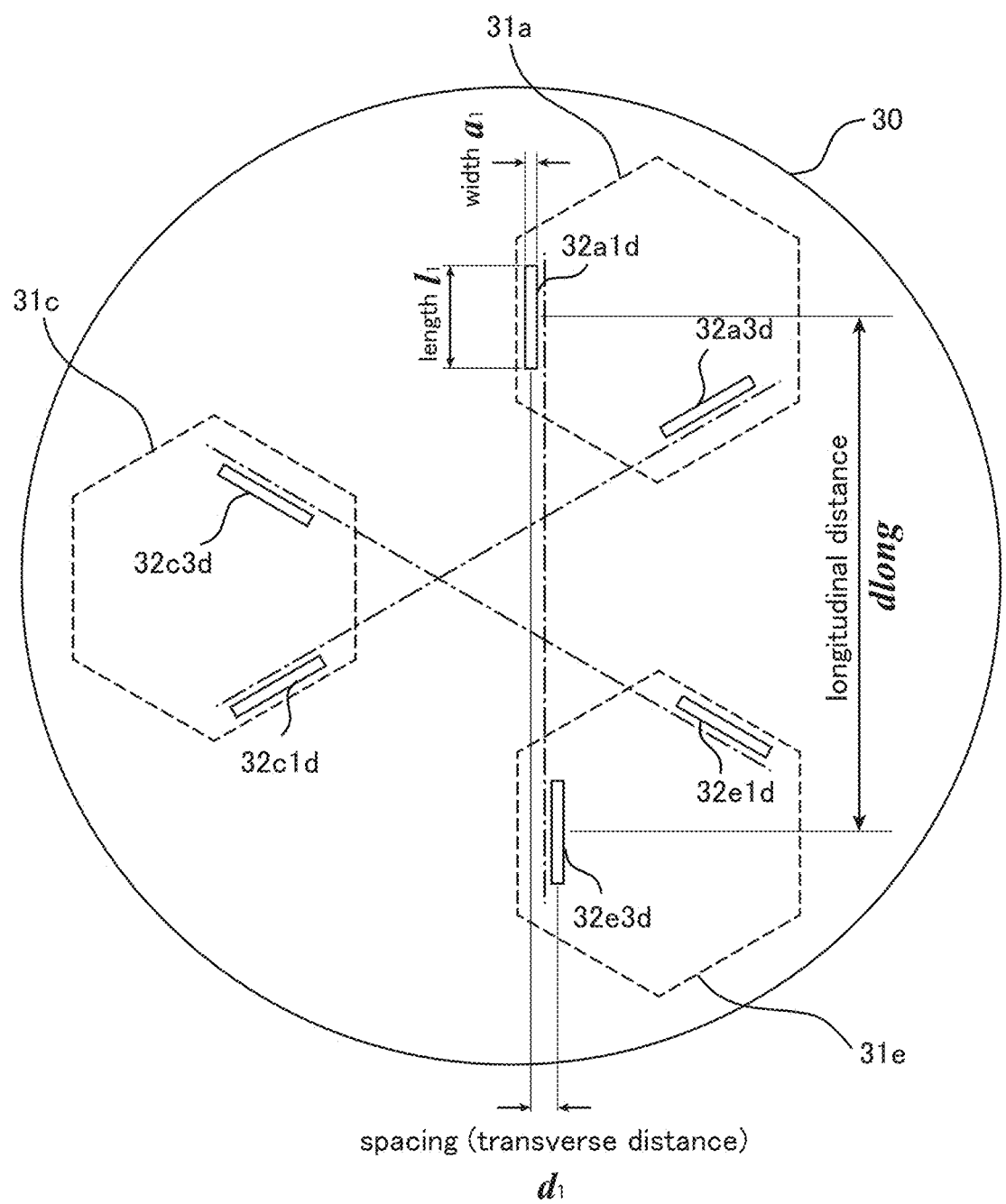
FIG. 22 is a diagram showing an example of the arrangement of slits on the mask 30 (distributed primary slit pair).

Typically, a primary slit 32 is opposed to another primary slit which extends parallel thereto with a small spacing therebetween, to form a pair of primary slits. They are "opposed" to each other, which means they are arranged such that a midpoint of one of the pair of primary slits 32 is located on a perpendicular line extending from a midpoint of the other primary slit 32. Then, respective diffraction patterns from the pair of primary slits 32 are brought into interference with each other to produce an interference pattern (interference fringe). However, from a viewpoint of producing an interference fringe, the pair of primary slits need not necessarily be opposed to each other. As long as two slits are parallel to each other, and the given spacing (transverse distance) between the two slits is set to a small value, it is possible to produce an interference fringe having a period enough to allow for observation thereof, even if the two slits are not opposed to each other, i.e., are spaced apart from each other in a direction parallel to the slits (in the longitudinal direction of the slits). In a situation where sides of paired regions of two of the plurality of mirror segment images are not adjacent to each other, but spaced apart from each other, if it is attempted to arrange two primary slits in opposed relation to each other, the spacing between the pair of primary slits is significantly increased, resulting in failing to generate an observable interference fringe. In such a situation, an observable interference fringe can be generated by arranging two slits such that they are spaced apart from each other in a direction parallel to the slits, while maintaining the spacing (transverse distance) between the pair of slits at a given small value. Such primary slits are distributed in the longitudinal direction to form a pair of primary slits. Thus, they will hereinafter be referred to as "distributed primary slit pair". FIG. 22 shows one example of the arrangement of a plurality of distributed primary slit pairs. Two distributed primary slits of the distributed primary slit pair are formed, respectively, in paired regions of two of the plurality of mirror segment images, such that they are arranged parallel to each other with a given transverse distance therebetween and spaced apart from each other by a given longitudinal distance. Generally, the longitudinal distance is equivalent to a distance between respective centers of the two mirror segment images. In a case where each of the plurality of mirror segment images has a polygonal shape, and the paired regions of the two mirror segment images have, respectively, two sides located at positions adjacent to a central region of the primary mirror, and on the same straight line, two distributed primary slits of the distributed primary slit pair are preferably formed parallel and adjacent to the respective sides of the paired regions of the two mirror segment images. Thus, the plurality of distributed primary slit pairs is typically arranged such that directions thereof intersect with each other at different angles. The longitudinal distance which is a spaced-apart distance in a direction parallel to the slits is equivalent to a distance between: an intersection point of a perpendicular line drawn from a midpoint of one of the pair of primary slits to the other primary slit (or a straight line including a center line of the other primary slit) and the straight line; and a midpoint of the other primary slit. The pair of primary slits which are "opposed" to each other can be deemed to be one particular example in which the "longitudinal distance" is zero.

(Reference Slit)

The reference slit is a slit capable of producing a diffraction pattern which intersects with a diffraction pattern from the pair of primary slits, at an angle which is not parallel to the diffraction pattern from the pair of primary slits, to form an intersection point. That is, the reference slit is a slit which is not parallel to a direction of the primary slit (or the pair of the primary slits), but extends at a given angle with respect to the direction of the primary slit so as to allow a diffraction pattern therefrom to intersect with a diffraction pattern from the pair of the primary slits. The diffraction pattern of the reference slit intersects with the diffraction pattern from the pair of the primary slits at the same angle as the given angle of the reference slit with respect to the pair of primary slit 32. The reference slit formed in the mask 30 is roughly classified into (1) an auxiliary slit formed in the mirror segment image in which one of a pair of primary slits exists, at a position adjacent to the one primary slit, to extend at a given angle with respect to the one primary slit, and (2), in a situation where a certain primary slit (or a certain pair of opposed primary slits each producing the same interference pattern) is disposed adjacent to a boundary between paired regions of two of the plurality of mirror segment images, another primary slit (or another pair of opposed primary slits each producing the same interference pattern) disposed adjacent to another boundary different from a boundary around which the certain primary slit (or the certain pair of opposed primary slits) is disposed, to extend at a given angle with respect to the certain primary slit. In the case where the reference slit is composed of another primary slit, it may be the rotated primary slit pair or the distributed primary slit pair. Further, the member of auxiliary slits may be formed by a number of one, or may be formed by a number of two, respect to one primary slit (or one pair of opposed primary slits each producing the same interference pattern). This will be described in detail below.

(Configuration of Reference Slit—in the Case where the Number of Auxiliary Slits is One)

Figure 8:
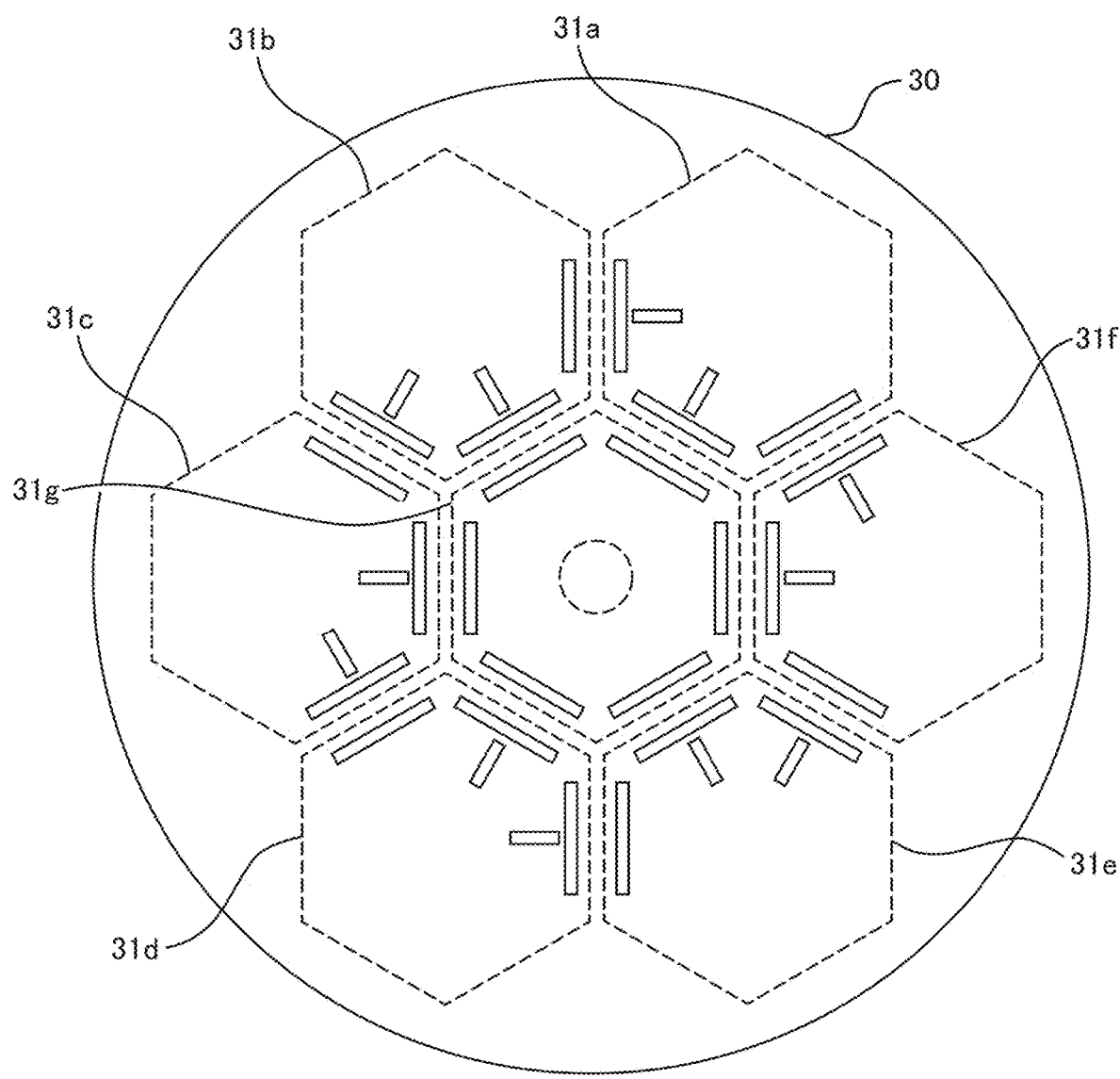
FIG. 8 is a diagram showing an example of the arrangement of slits on the mask 30 (in the case where the number of auxiliary slits is one).

FIG. 6 is a diagram enlargedly showing an example of the arrangement of slits on the mask 30 in the case where the number of auxiliary slits is one with respect to the primary slit. FIG. 8 is a diagram showing an example of the arrangement of slits on the mask 30 in the case where the number of auxiliary slits is one with respect to the primary slit. In FIGS. 6 and 8, mirror segment images 31a, 31b, 31c, 31d, 31e, 31f corresponding, respectively, to six mirror segments 10a, 10b, 10c, 10d, 10e, 10f are indicated by the broken lines (in FIG. 6, the illustration of the segment images 31d, 31e is omitted). Although the mirror segment image is actually obtained by rotating the posture of the corresponding mirror segment 180-degree, the mirror segment image to be projected on a lower region in the figures is depicted as if it were in an upper region, for the sake of explanation.

With reference to FIG. 6, slits in regions of the mirror segment image 31a and slits in opposed regions of the mirror segment image 31b will be described. In the mirror segment image 31a, a primary slit 32a1 is formed in a region adjacent to one side of the mirror segment image 31a opposed to the mirror segment image 31b, in parallel relation to this side, and an auxiliary slit 33a1 is formed to extend from a position close to the primary slit 32a1 toward the inner side of the mirror segment image 31a, at an angle perpendicular to the primary slit 32a1. In FIG. 6, the primary slit 32 is depicted such that it has a length close to the length of one side of the hexagonal-shaped mirror segment image. However, the primary slit 32 may have a shorter length. The auxiliary slit needs not necessarily be perpendicular to the primary slit, as long as it is formed at a given angle which is not parallel to the primary slit. Preferably, the auxiliary slit 33a1 is disposed adjacent to a midpoint of the primary slit 32a1. No auxiliary slit is formed with respect to a primary slit 32b3 formed in a region of the mirror segment image 31b opposed to the primary slit 32a1. Further, in the mirror segment image 31a, a primary slit 32a2 is formed in a region adjacent to another side of the mirror segment image 31a opposed to a mirror segment image 31g, and an auxiliary slit 33a2 is formed to extend from a position close to the primary slit 32a2 toward the inner side of the mirror segment image 31a, at an angle perpendicular to the primary slit 32a2. No auxiliary slit is formed with respect to a primary slit 32g6 formed in a region of the mirror segment image 31g opposed to the primary slit 32a2. Further, in the mirror segment image 31a, a primary slit 32a3 is formed in a region adjacent to yet another side of the mirror segment image 31a opposed to the mirror segment image 31f. An auxiliary slit 33f1 is formed with respect to a primary slit 32f1 formed in a region of the mirror segment image 31f opposed to the primary slit 32a3, and thereby no auxiliary slit is formed with respect to the primary slit 32a3.

In the mirror segment image 31b, the primary slit 32b3 is formed in the region adjacent to one side of the mirror segment image 31b opposed to the mirror segment image 31a and opposed to the primary slit 32a1, in parallel relation to the primary slit 32a1. Since the auxiliary slit 33a1 is formed with respect to the primary slit 32a1 formed in the region of the mirror segment image 31a opposed to the primary slit 32*b*3, and thereby no auxiliary slit is formed with respect to the primary slit 32*b*3. Further, in the mirror segment image 31*b*, a primary slit 32*b*1 is formed in a region adjacent to another side of the mirror segment image 31*b* opposed to the mirror segment image 31*c*, and an auxiliary slit 33*b*1 is formed to extend from a position close to the primary slit 32*b*1 toward the inner side of the mirror segment image 31*b*, at an angle perpendicular to the primary slit 32*b*1. No auxiliary slit is formed with respect to a primary slit 32*c*3 formed in a region of the mirror segment image 31*c* opposed to the primary slit 32*b*1. Further, in the mirror segment image 31*b*, a primary slit 32*b*2 is formed in a region adjacent to yet another side of the mirror segment image 31*b* opposed to the mirror segment image 31*g*, and an auxiliary slit 33*b*2 is formed to extend from a position close to the primary slit 32*b*2 toward the inner side of the mirror segment image 31*b*, at an angle perpendicular to the primary slit 32*b*2. No auxiliary slit is formed with respect to a primary slit 32*g*1 formed in a region of the mirror segment image 31*g* opposed to the primary slit 32*b*2.

FIG. 8 shows a positional relationship among all of the mirror segment images 31*a*, 31*b*, 31*c*, 31*d*, 31*e*, 31*f*, all of the primary slits and all of the auxiliary slits. Since the auxiliary slit may be provided by the number of one with respect to the pair of opposed primary slits, it may be formed with respect to one of the pair of opposed primary slits.

(Configuration of Reference Slit—in the Case where the Number of Auxiliary Slits is Two)

Figure 7:
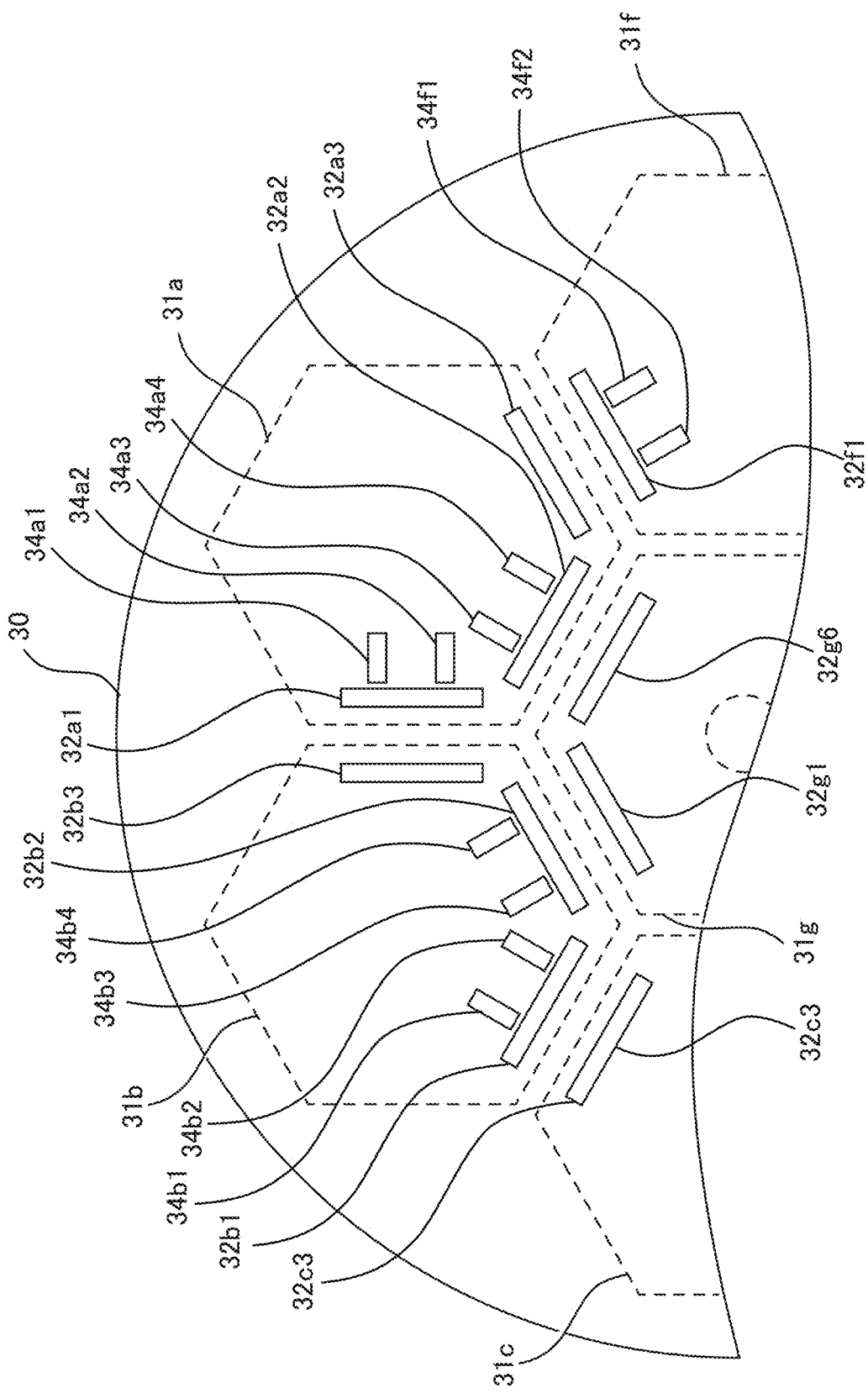
FIG. 7 is a diagram enlargedly showing an example of the arrangement of slits on the mask 30 (in a case where the number of auxiliary slits is two).
Figure 9:
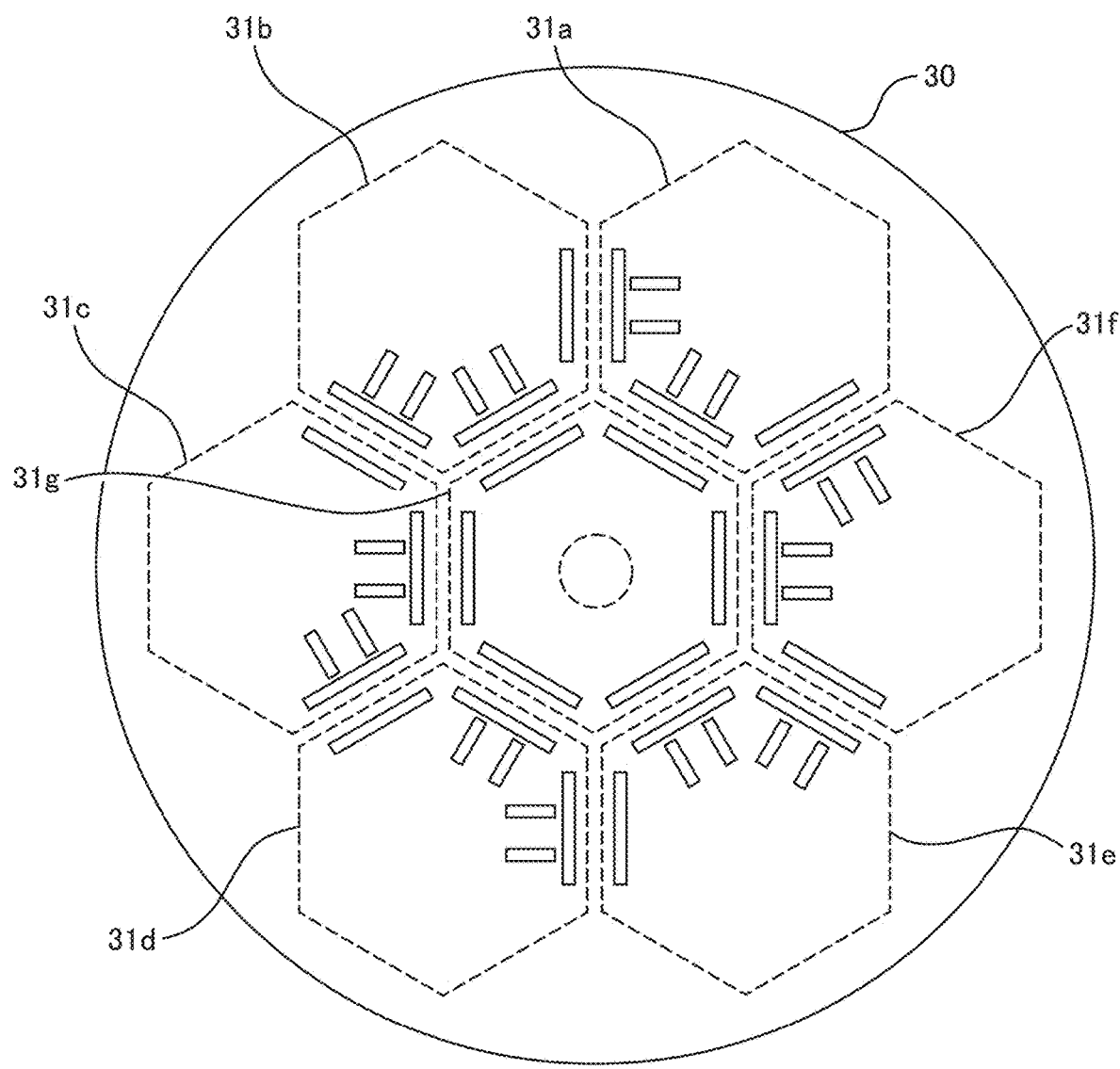
FIG. 9 is a diagram showing an example of the arrangement of slits on the mask 30 (in the case where the number of auxiliary slits is two).

FIG. 7 is a diagram enlargedly showing an example of the arrangement of slits on the mask 30 in the case where the number of auxiliary slits is two. FIG. 9 is a diagram showing an example of the arrangement of slits on the mask 30 in the case where the number of auxiliary slits is two. In FIGS. 7 and 9, the mirror segment images 31*a*, 31*b*, 31*c*, 31*d*, 31*e*, 31*f* corresponding, respectively, to the mirror segments 10*a*, 10*b*, 10*c*, 10*d*, 10*e*, 10*f* are indicated by the broken lines (in FIG. 7, the illustration of the segment images 31*d*, 31*e* is omitted).

With reference to FIG. 7, slits in regions of the mirror segment image 31*a* and slits in opposed regions of the mirror segment image 31*b* will be described. In the mirror segment image 31*a*, a primary slit 32*a*1 is formed in a region adjacent to one side of the mirror segment image 31*a* opposed to the mirror segment image 31*b*, and two auxiliary slits 34*a*1, 34*a*2 are formed to extend from respective positions close to the primary slit 32*a*1 toward the inner side of the mirror segment image 31*a*, at an angle perpendicular to the primary slit 32*a*1. The slits 34*a*1, 34*a*2 are parallel and opposed to each other. Preferably, each of the pair of slits 34*a*1, 34*a*2 has the same length and the same width. The primary slit 32 is depicted such that it has a length close to the length of one side of the hexagonal-shaped mirror segment image. However, the primary slit 32 may have a shorter length. No auxiliary slits are formed with respect to a primary slit 32*b*3 formed in a region of the mirror segment image 31*b* opposed to the primary slit 32*a*1. Further, in the mirror segment image 31*a*, a primary slit 32*a*2 is formed in a region adjacent to another side of the mirror segment image 31*a* opposed to the mirror segment image 31*g*, and two auxiliary slits 34*a*3, 34*a*4 are formed to extend from respective positions close to the primary slit 32*a*2 toward the inner side of the mirror segment image 31*a*, at an angle perpendicular to the primary slit 32*a*2. Preferably, the auxiliary slits 34*a*3, 34*a*4 are preferably arranged such that a midpoint therebetween is located around a midpoint of the primary slit 32*a*2. No auxiliary slits are formed with respect to a primary slit 32*g*6 formed in a region of the mirror segment image 31*g* opposed to the primary slit 32*a*2. Further, in the mirror segment image 31*a*, a primary slit 32*a*3 is formed in a region adjacent to yet another side of the mirror segment image 31*a* opposed to the mirror segment image 31*f*. Two auxiliary slits 34*f*1, 34*f*2 are formed with respect to a primary slit 32*f*1 formed in a region of the mirror segment image 31*f* opposed to the primary slit 32*a*3, and thereby no auxiliary slits are formed with respect to the primary slit 32*a*3.

In the mirror segment image 31*b*, the primary slit 32*b*3 is formed in the region adjacent to one side of the mirror segment image 31*b* opposed to the mirror segment image 31*a*. Since the auxiliary slits 34*a*1, 34*a*2 are formed with respect to the primary slit 32*a*1 formed in the region of the mirror segment image 31*a* opposed to the primary slit 32*b*3, and thereby no auxiliary slits are formed with respect to the primary slit 32*b*3. Further, in the mirror segment image 31*b*, a primary slit 32*b*1 is formed in a region adjacent to another side of the mirror segment image 31*b* opposed to the mirror segment image 31*c*, and two auxiliary slits 34*b*1, 34*b*2 are formed to extend from respective positions close to the primary slit 32*b*1 toward the inner side of the mirror segment image 31*b*, at an angle perpendicular to the primary slit 32*b*1. No auxiliary slits are formed with respect to a primary slit 32*c*3 formed in a region of the mirror segment image 31*c* opposed to the primary slit 32*b*1. Further, in the mirror segment image 31*b*, a primary slit 32*b*2 is formed in a region adjacent to yet another side of the mirror segment image 31*b* opposed to the mirror segment image 31*g*, and two auxiliary slits 34*b*3, 34*b*4 are formed to extend from respective positions close to the primary slit 32*b*2 toward the inner side of the mirror segment image 31*b*, at an angle perpendicular to the primary slit 32*b*2. No auxiliary slits are formed with respect to a primary slit 32*g*1 formed in a region of the mirror segment image 31*g* opposed to the primary slit 32*b*2.

FIG. 9 shows a positional relationship among all of the mirror segment images 31*a*, 31*b*, 31*c*, 31*d*, 31*e*, 31*f*, all of the primary slits and all of the auxiliary slits. Since the two auxiliary slits may be provided by one pair with respect to the pair of opposed primary slits, the pair of auxiliary slits may be formed with respect to one of the pair of opposed primary slits.

(Configuration of Reference Slit—in the Case where Reference Slit is Composed of Another Primary Slit)

Figure 10:
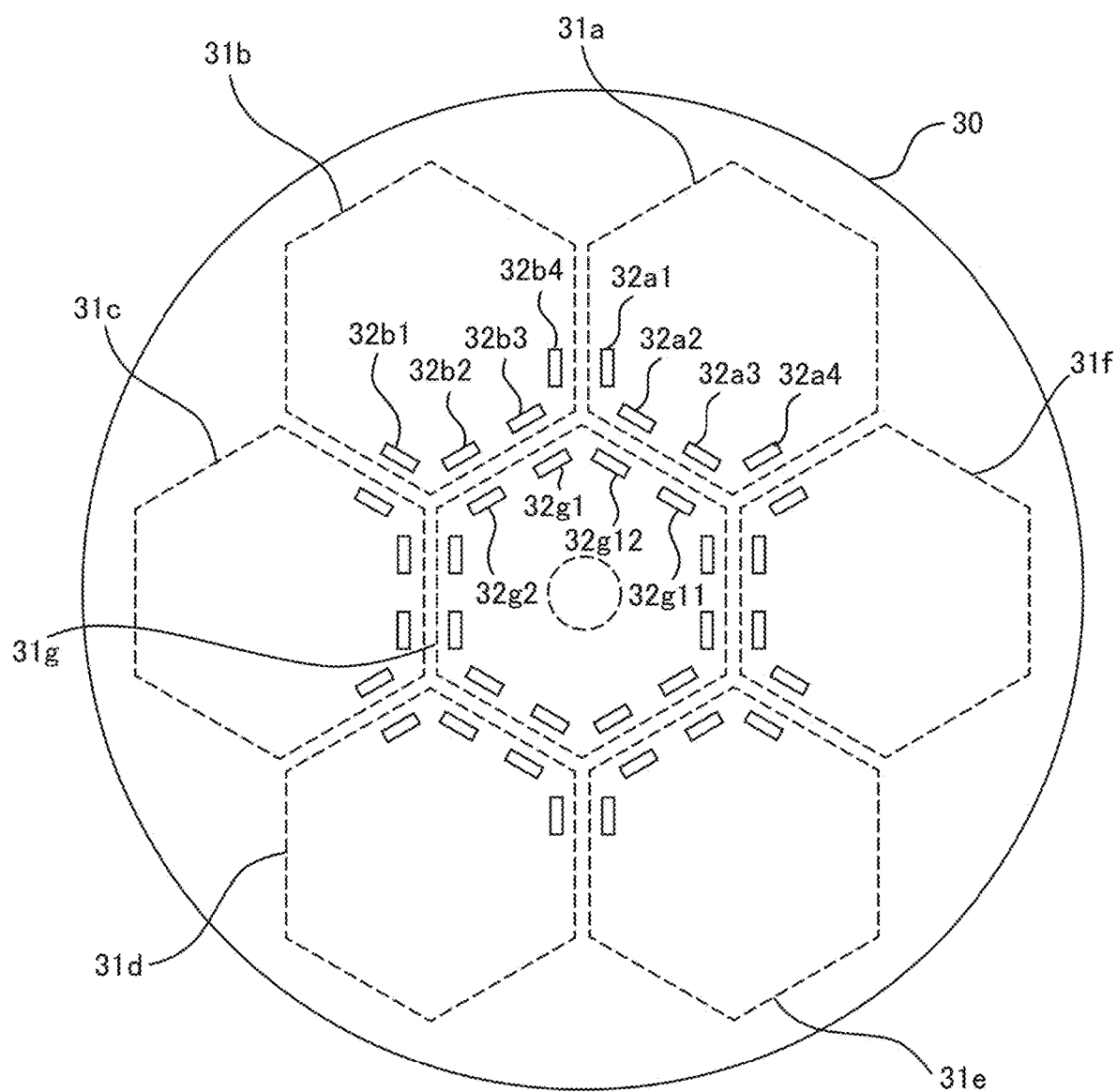
FIG. 10 is a diagram showing an example of the arrangement of slits on the mask 30 (in a case where a reference slit is composed of another primary slit).

FIG. 10 is a diagram showing an example of the arrangement of slits on the mask 30, in a case where the reference slit is another primary slit. In FIG. 10, the mirror segment images 31*a*, 31*b*, 31*c*, 31*d*, 31*e*, 31*f* corresponding, respectively, to the mirror segments 10*a*, 10*b*, 10*c*, 10*d*, 10*e*, 10*f* are indicated by the broken lines. In this example where a certain primary slit (or a certain pair of opposed primary slits each producing the same interference pattern) is disposed adjacent to a boundary between paired regions of two of the six mirror segment images, the reference slit is composed of another primary slit (or another pair of opposed primary slits each producing the same interference pattern) disposed adjacent to another boundary different from a boundary around which the certain primary slit (or the certain pair of opposed primary slits) is disposed. Preferably, the "another boundary different from a boundary around which the certain primary slit is disposed" is another boundary which is adjacent to but not parallel to the boundary around which the certain primary slit. In this case, in the hexagonal-shaped mirror segment image 31, a certain primary slit and another primary slit serving as the reference slit are located in respective regions corresponding to continuous two sides of the mirror segment image 31. Any one of the mirror segment images has a primary slit which is parallel and opposed to a primary slit of another mirror segment image adjacent thereto, across a boundary therebetween. In this example, the primary slits are formed in respective regions arranged rotationally symmetrically with respect to an intersection point of three boundaries among three of the mirror segment images. The primary slit may be provided by a number of one with respect to one side of the mirror segment image. In this example, with respect to one side of the mirror segment image, one or two short primary slits are provided in a region adjacent to the intersection point of the three boundaries among the three mirror segment images, in conformity to the arrangement of six lenses of the imaging lens system as will described later in connection with FIG. 12. In this way, the three pairs of primary slits are arranged in the rotationally symmetrical regions, respectively, so that it becomes possible to allow three interference patterns from the three pairs of primary slits to intersect with each other. In the mirror segment image 31a, a primary slit 32a1 is formed in a region adjacent to one side of the mirror segment image 31a opposed to the mirror segment image 31b, in parallel relation to this side, and, in the mirror segment image 31b, a primary slit 32b4 is formed in a region thereof opposed to the primary slit 32a1. A diffraction pattern producing an interference fringe is formed by the pair of primary slit 32a1, 32b4. As a boundary next to a boundary between the mirror segment image 31a and the mirror segment image 31b, there are a boundary between the mirror segment image 31b and the mirror segment image 31g, and a boundary between the mirror segment image 31a and the mirror segment image 31g. Each of the pairs of primary slits arranged along the adjacent boundaries extend at an angle of 120 degrees with respect to the pair of primary slit 32a1, 32b4, so that interference patterns of the three pairs of primary slits form an intersection point serving as a criterion.

A pair of primary slits 32b3, 32g1 are located across the boundary between the mirror segment image 31b and the mirror segment image 31g, to serve as a reference slit for the pair of primary slit 32a1, 32b4. Here, although a pair of primary slits 32b2, 32g2 are also located across the boundary between the mirror segment image 31b and the mirror segment image 31g, the pair of primary slits 32b2, 32g2 are not used as a reference slit for the pair of primary slit 32a1, 32b4, because the pair of primary slits 32b2, 32g2 are distant from the pair of primary slits 32a1, 32b4, and the light from the pair of primary slits 32b2, 32g2 passes through a lens different from a lens for the pair of primary slit 32a1, 32b4 among the six lenses of the imaging lens system as will described later in connection with FIG. 12. Further, a pair of primary slits 32a2, 32g12 are located across the boundary between the mirror segment image 31a and the mirror segment image 31g, to serve as a reference slit for the pair of primary slit 32a1, 32b4. Here, although a pair of primary slits 32a3, 32g11 are also located across the boundary between the mirror segment image 31a and the mirror segment image 31g, the pair of primary slits 32a3, 32g11 are not used as a reference slit for the pair of primary slit 32a1, 32b4, because the pair of primary slits 32a3, 32g11 are distant from the pair of primary slit 32a1, 32b4, and the light from the pair of primary slits 32a3, 32g11 passes through a lens different from the lens for the pair of primary slit 32a1, 32b4 among the six lenses of the imaging lens system as will described later in connection with FIG. 12. In this example, one pair of primary slits have adjacent two pairs of primary slits as the reference slit. In this way, another pair of primary slits can be used as the reference slit. This makes it possible to reduce the total number of slits, and reduce the number of intersection points of diffraction patterns to be observed. In the above example, in the case where one or two auxiliary slits are used as the reference slit, the number of the intersection points is twelve, whereas, in the case where another pair of primary slits are used as the reference slit, the number of the intersection points is six.

(Configuration of Reference Slit—Rotated Primary Slit Pair)

FIG. 20 is a diagram showing an example of the arrangement of slits on the mask 30, in a case where the reference slit is composed of another rotated primary slit pair). In FIG. 20, the mirror segment images 31a, 31b, 31c, 31d, 31e, 31f corresponding, respectively, to the mirror segments 10a, 10b, 10c, 10d, 10e, 10f are indicated by the broken lines. It should be noted that the mirror segment 10g having an opening in a central region thereof is not used in this example, and thus the mirror segment image 31g corresponding thereto does not exist. Specifically, the six hexagonal-shaped mirror segments 10a, 10b, 10c, 10d, 10e, 10f are arranged such that two sided of adjacent two of them are opposed to each other to define a central space having a regular hexagonal shape. In paired regions of two of the six mirror segment images on the mask 30 corresponding to paired regions of the mirror segments 10, a pair of primary slits parallel and opposed to each other are arranged adjacent to a boundary between the paired regions of the two mirror segment images, but non-parallel to the boundary, i.e., rotated at a given angle with respect to the boundary, to form a rotated primary slit pair. A reference slit for a certain one of six rotated primary slit pairs is composed of any of other rotated primary slit pairs, i.e., the remaining rotated primary slit pairs. Each of the six rotated primary slit pairs is disposed in non-parallel relation to the remaining rotated primary slit pairs. That is, directions (direction in the longitudinal direction) of the six rotated primary slit pairs intersect with each other at different angles. Such an arrangement makes it possible to prevent diffraction patterns of respective light ray groups passing through the six rotated primary slit pairs from overlapping each other. Thus, for a certain one of the six rotated primary slit pairs, the remaining rotated primary slit pairs can serve as the reference slit. However, actually, among the remaining rotated primary slit pairs, a rotated primary slit pair intersecting with the certain rotated primary slit pair at about 90 degrees is used as the reference slit. As above, diffraction patterns from all of the six rotated primary slit pairs intersect with each other at given angles without overlapping. Thus, there is no need to configure the imaging lens system such that a small lens is disposed in each region where a diffraction pattern is generated, as described later. Each of the mirror segment images has one of two rotated primary slits of the rotated primary slit pair, wherein the two primary slits are arranged parallel to each other across a boundary with adjacent one of the remaining mirror segment images, but rotated with respect to the boundary. In this example, the two rotated primary slits are disposed on both sides of each of six boundaries defined between adjacent ones of the six mirror segment images. Since the number of mirror segment images is six, the six boundaries intersect with each other at integral multiples of a unit angle of 60 degrees. Thus, if two primary slits are arranged parallel to each other (without rotating) with respect to the boundary, diffraction patterns from two pairs of primary slits will overlap each other, resulting in failing to distinguish them. In order to prevent such a situation, each of the six rotated primary slit pairs is rotated by 15 degrees with respect to a corresponding one of the boundaries among the mirror segment images, while alternately changing the direction of rotation, so as to prevent any two or more of the six rotated primary slit pairs from being oriented at the same angle. Thus, the six rotated primary slit pairs will intersect with each other at integral multiples of a unit angle of 30 degrees. As a result, diffraction patterns therefrom will intersect with each other at integral multiples of a unit angle of 30 degrees, without overlapping each other. An intersecting angle between the rotated primary slit pairs requires allowing two diffraction patterns to be spaced apart from each other in the rotation direction to the extent that they can be observed, and needs to be 10 degrees at the minimum. When the six rotated primary slit pairs are arranged to intersect with each other at integral multiples of a unit angle of 30 degrees, a minimum intersecting angle between the rotated primary slit pairs appears at even angular intervals. Specifically, since the rotated primary slit pair exists by a number of 6, it is possible to arrange them such that directions thereof intersect with each other at integral multiples of a unit angle of 180 degrees/6=30 degrees. In this case, directions of the six rotated primary slit pairs will intersect with each other at integral multiples of a largest unit angle. Thus, when observing diffraction patterns obtained from the six rotated primary slit pairs, overlapping of interference patterns such as interference fringes can be minimized, so that it is possible to most precisely observe the interference patterns. More specifically, in the mirror segment image 31a, a rotated primary slit 32a1r is formed in a region adjacent to one side of the mirror segment image 31a opposed to the mirror segment image 31b, in a state in which it is rotated 15 degrees clockwisely with respect to this side, and, in the mirror segment image 31d, a rotated primary slit 32b3r is formed at a position opposed to and in parallel relation to the rotated primary slit 32a1r. A diffraction pattern producing an interference fringe is formed by a rotated primary slit pair 32p1 composed of the rotated primary slit 32a1r and the rotated primary slit 32b3r. In the mirror segment image 31b, a rotated primary slit 32b1r is formed in a region adjacent to another side of the mirror segment image 31b opposed to the mirror segment image 31c, in a state in which it is rotated 15 degrees counterclockwisely with respect to this side, and, in the mirror segment image 31c, a rotated primary slit 32c3r is formed at a position opposed to and in parallel relation to the rotated primary slit 32b1r. A diffraction pattern producing an interference fringe is formed by a rotated primary slit pair 32p2 composed of the rotated primary slit 32b1r and the rotated primary slit 32c3r. Similarly, a rotated primary slit pair 32p3 composed of a rotated primary slit 32c1r in the mirror segment image 31c and a rotated primary slit 32d3r in the mirror segment image 31d, and rotated 15 degrees clockwisely, a rotated primary slit pair 32p4 composed of a rotated primary slit 32d1r in the mirror segment image 31d and a rotated primary slit 32e3r in the mirror segment image 31e, and rotated 15 degrees counterclockwisely, a rotated primary slit pair 32p5 composed of a rotated primary slit 32e1r in the mirror segment image 31e and a rotated primary slit 32f3r in the mirror segment image 31f, and rotated 15 degrees clockwisely, and a rotated primary slit pair 32p6 composed of a rotated primary slit 32f1r in the mirror segment image 31f and a rotated primary slit 32a3r in the mirror segment image 31a, and rotated 15 degrees counterclockwisely, are formed. All diffraction patterns from the six rotated primary slit pairs intersect with each other at at integral multiples of a unit angle of 30 degrees. As above, the reference slit for a certain one of the rotated primary slit pairs is composed of another rotated primary slit pair. In this case, even if all diffraction patterns are projected concurrently, it is possible to identify an interference fringe of each of the diffraction patterns and observe a peak position of the interference fringe, thereby accurately identifying the shift amount of the interference fringe. Thus, there is no need to employ a configuration in which the imaging lens system is composed of a set of small lenses corresponding to a plurality of primary slit pairs, as described later.

(Configuration of Reference Slit—Distributed Primary Slit Pair)

FIG. 22 is a diagram showing an example of the arrangement of slits on the mask 30, in a case where the reference slit is composed of another distributed primary slit. The distributed primary slit pair is composed of a first distributed primary slit which is formed in a certain one of the mirror segment images at a position adjacent to and parallel to one side of the certain mirror segment image, and a second distributed primary slit which is located at a position spaced apart from the first distributed primary slit in direction parallel to the first distributed primary slit, with a spacing (transverse distance, i.e., a distance between two parallel lines each including a center line of each of the first and second distributed primary slits) therebetween, wherein the spacing is small enough to produce an interference fringe. In FIG. 22, the mirror segment images 31a, 31c, 31e, corresponding, respectively, to the mirror segments 10a, 10c, 10e are indicated by the broken lines. This mirror segment configuration is obtained by alternately omitting one mirror segment from the configuration in which the six hexagonal-shaped mirror segments 10a, 10b, 10c, 10d, 10e, 10f are arranged such that two sided of adjacent two of them are opposed to each other to define a central space having a regular hexagonal shape. Adjacent two of the mirror segment images are spaced apart from each other with a distance of one side of the hexagonal shape or more therebetween. Thus, if two parallel slits are arranged in opposed relation, the spacing therebetween is increased, so that the period of an interference fringe is significantly shortened, resulting in becoming unobservable. In order to prevent such a situation, the distributed primary slit pair is configured such that two distributed primary slits are spaced apart from each other with a relatively large longitudinal distance, while the spacing (transverse distance) between the two distributed primary slits are maintained at a desirably small value. In the mirror segment image 31a and the mirror segment image 31c, a distributed primary slit 32a3d and a distributed primary slit 32c1d are formed adjacent, respectively, to mutually-parallel sides of the mirror segment images 31a, 31c located close to the mirror segment image 31e, at respective positions allowing the transverse distance therebetween to become desirably small. In FIG. 22, the one-dot chain line indicated between the distributed primary slit 32a3d and the distributed primary slit 32c1d is a reference line which is parallel to these slits and passes through a midpoint therebetween (a point having the same transverse distance to each of the slits). The reference line is parallel to the sides of the mirror segment images 31a, 31c around which the distributed primary slit 32a3d and the distributed primary slit 32c1d are formed. In this case, the two mirror segment images are not opposed at a short distance, and therefore it is difficult to imagine a boundary between the mirror segment images. However, the reference line across and around which the distributed primary slit pair is formed is substantially the same as the boundary across and around which the mirror segment images are opposed to each other. In FIG. 22, each of the distributed primary slits is disposed at a position close to a region corresponding to a central region of the primary mirror, to the extent that the pair of distributed primary slits spaced apart from each other with a desirably small transverse distance therebetween across the reference line can be formed in respective paired regions of two of the mirror segment images.

Similarly, in the mirror segment image 31c and the mirror segment image 31e, a distributed primary slit 32c3d and a distributed primary slit 32e1d are formed adjacent, respectively, to mutually-parallel sides of the mirror segment images 31c, 31e located close to the mirror segment image 31a, at respective positions allowing the transverse distance therebetween to become desirably small. Further, in the mirror segment image 31e and the mirror segment image 31a, a distributed primary slit 32e3d and a distributed primary slit 32a1d are formed adjacent, respectively, to mutually-parallel sides of the mirror segment images 31e, 31a located close to the mirror segment image 31c, at respective positions allowing the transverse distance therebetween to become desirably small. In this way, two distributed primary slits can be formed, respectively, in two of mirror segment images corresponding to the mirror segments, such that they are arranged parallel to each other with a given spacing therebetween while being spaced apart from each other by a given longitudinal distance, at positions adjacent to respective sides of the two mirror segment images. By providing the distributed primary slit pairs in this manner, it becomes possible to produce, in a diffraction pattern, an interference fringe allowing the size of a step between paired regions of the two mirror segments located at a relatively large longitudinal distance to be identified.

(Imaging Lens System)

Figure 11:
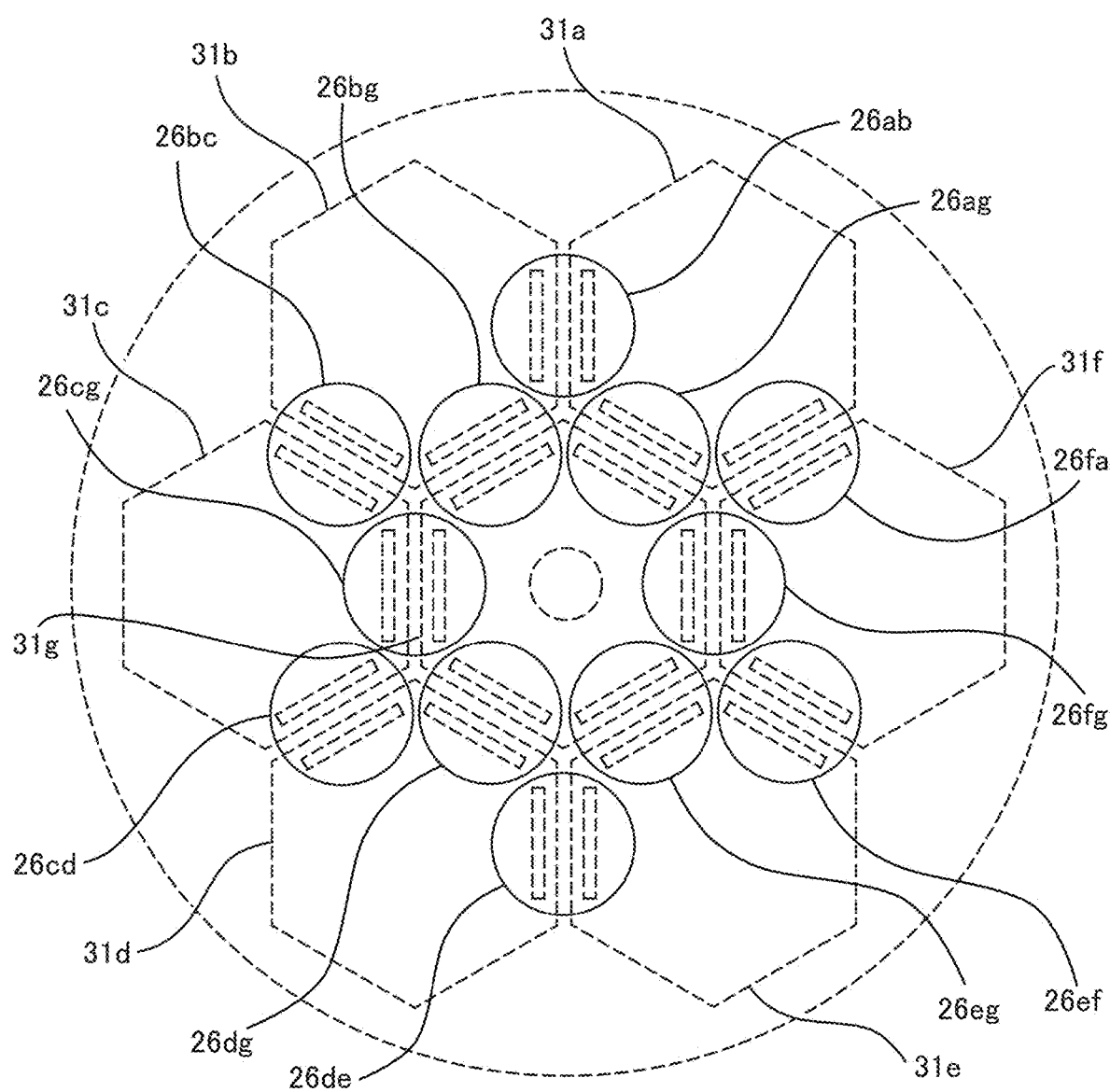
FIG. 11 is a diagram showing an example of an array of lenses 26 for a diffraction pattern (in a case where the reference slit is composed of an auxiliary slit).

Preferably, a diffraction pattern including an interference fringe is projected onto the detector 40 via an imaging lens system. The imaging lens system may be composed of a single lens. Alternatively, it may be configured such that a small lens is disposed in each region where a diffraction pattern including an interference fringe is generated. In this case, a plurality of diffraction patterns can be projected onto the detector 40, while being clearly separated from each other. In order to realize it, the imaging lens system may comprise an array of lenses each disposed correspondingly to intersection points of respective center lines of each of a plurality of pairs of opposed primary slits and a center line of each of a plurality of corresponding reference slits (in the case where the reference slit is composed of two auxiliary slits, respective center lines of them). This is because light passing through these slits can be projected via one lens, without preventing the light from pass through the periphery of the lens. FIG. 11 is a diagram showing an example of an array of lenses 26 for a diffraction pattern, in a case where the reference slit is an auxiliary slit. In this case, an array of twelve lens is required. In FIG. 11, the mask 30, the mirror segment images 31 of the mirror segments 30, and the primary slits 32 are indicated by the broken lines. It should be noted here that the illustration of the auxiliary slits is omitted. The twelve lenses 26 are arranged, respective, in regions of twelve pairs of primary slits. Specifically, for example, a lens 26ab is disposed in a region of a pair of primary slits located adjacent to opposed sides of the mirror segment images 31a, 31b. Other lenses are arranged in respective paired regions of the mirror segment images in a similar manner. It should be noted that, since the rotated primary slit pairs can be arranged to allow all diffraction patterns to be separated from each other, they eliminate the need to employ the configuration in which a small lens is disposed in each region where a diffraction pattern is generated.

Figure 12:
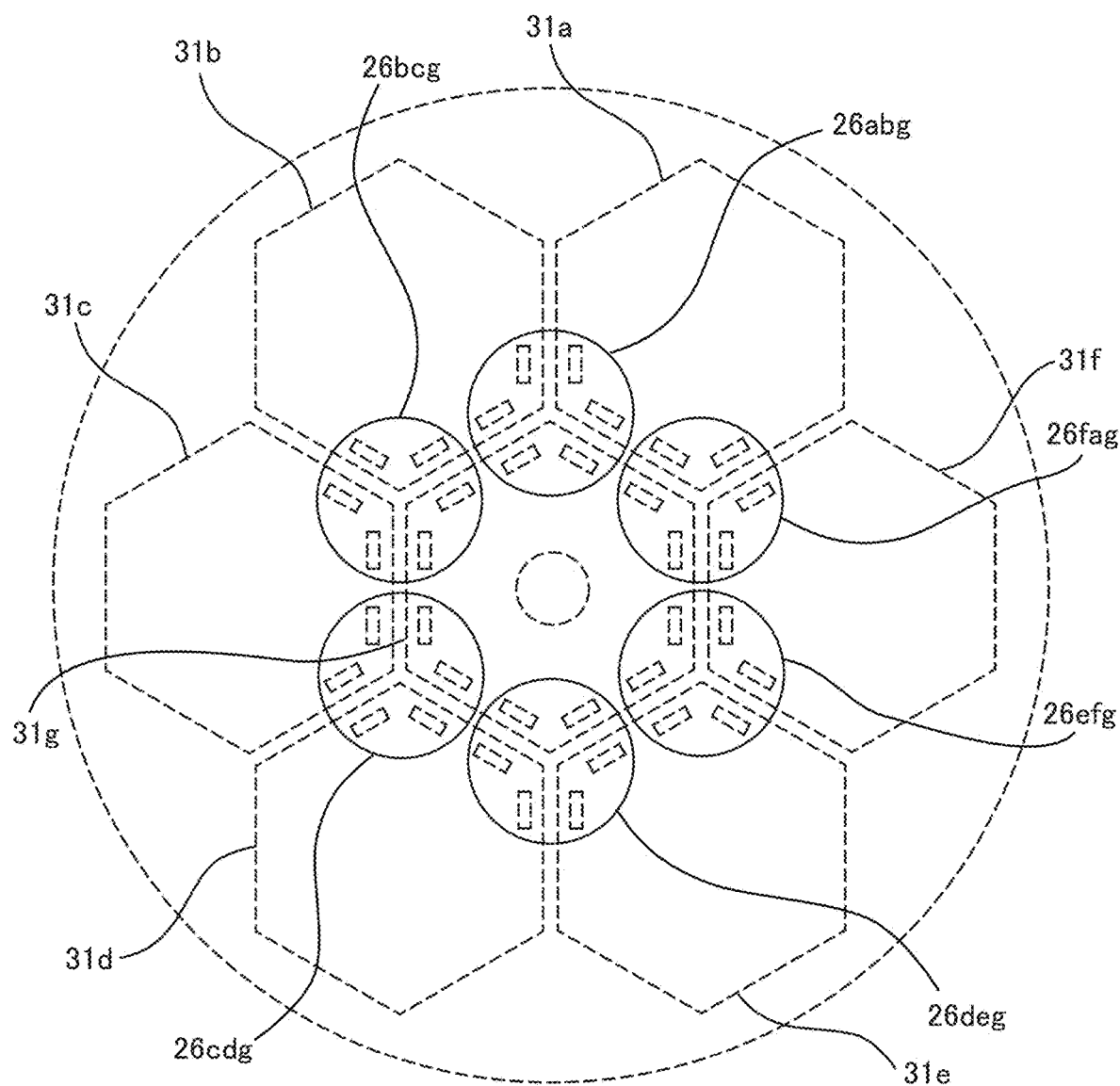
FIG. 12 is a diagram showing an example of an array of lenses 26 for the diffraction pattern (in the case where a reference slit is composed of another primary slit).

FIG. 12 is a diagram showing an example of an array of lenses 26, in a case where the reference slit is another primary slit, wherein a small lens is disposed in each region where a diffraction pattern is generated. In this case, an array of six lens may be arranged. In FIG. 12, with respect to one side of each mirror segment image, one or two short primary slits are provided adjacent to an intersection point of three boundaries among adjacent three mirror segment images, to prevent light passing through the primary slits from passing through the periphery of the lens having a relatively large aberration. In FIG. 12, the mask 30, the mirror segment images 31 of the mirror segments 30, and the primary slits 32 are indicated by the broken lines. The lens 26 is disposed around the intersection point of the three boundaries among the adjacent three mirror segment images. Specifically, a lens 26abg is disposed around a shared vertex of the mirror segment image 31a, the mirror segment image 31b and the mirror segment image 31g. Other lenses are arranged in respective paired regions of the mirror segment images in a similar manner.

(Design Example of Slits—One Auxiliary Slit)

A design example of slits and a diffraction pattern corresponding thereto will now be described. FIG. 13 is a diagram showing a design example of slits and an example of a resulting diffraction pattern in the case where the number of auxiliary slits is one. FIG. 13(a) shows an example of a slit pattern. Assuming that, with regard to a n-th slit group, width, length and spacing (spacing between a pair of slits) are denoted as $a_n$, $l_n$ and $d_n$, the width $a_n$ determines a viewable length of each diffraction pattern; the length $l_n$ exerts an influence on lightness; and the spacing $d_n$ determines the period of an interference fringe. With regard to two primary slits 32, width, length and spacing between respective center lines thereof are denoted as $a_1$, $l_1$ and $d_1$. Further, with regard to an auxiliary slit 33, width and length thereof are denoted as $a_2$ and $l_2$. FIG. 13(b) shows an example of the diffraction pattern in a case where the size of a step between two of the mirror segments (inter-mirror segment step) is 0.5 μm. A diffraction pattern extending vertically is a diffraction pattern from the two primary slits, wherein diffraction patterns from the two primary slits interfere with each other to generate an interference fringe. A thin diffraction pattern extending horizontally a diffraction pattern from the auxiliary slit. Since the auxiliary slit is a single slit, it does not have any interference fringe. Assuming that $\lambda_0$ denotes a center wavelength of a light source, and F denotes a focal length of a lens after the slits, the length of each diffraction pattern is proportional to:

$$\frac{\lambda_0 F}{a_n} \qquad \text{(Formula 1)}$$

Further, the period of the interference fringe is proportional to:

$$\frac{\lambda_0 F}{d_n} \qquad \text{(Formula 2)}$$

Assuming that the size of an inter-mirror segment step is denoted as ΔZ, the shift amount of an interference fringe in a direction orthogonal to the slits is expressed as:

$$\frac{F}{d_n} 2\Delta Z \qquad \text{(Formula 3)}$$

(Specific Design Example of Slits—One Auxiliary Slit)

Figure 14:
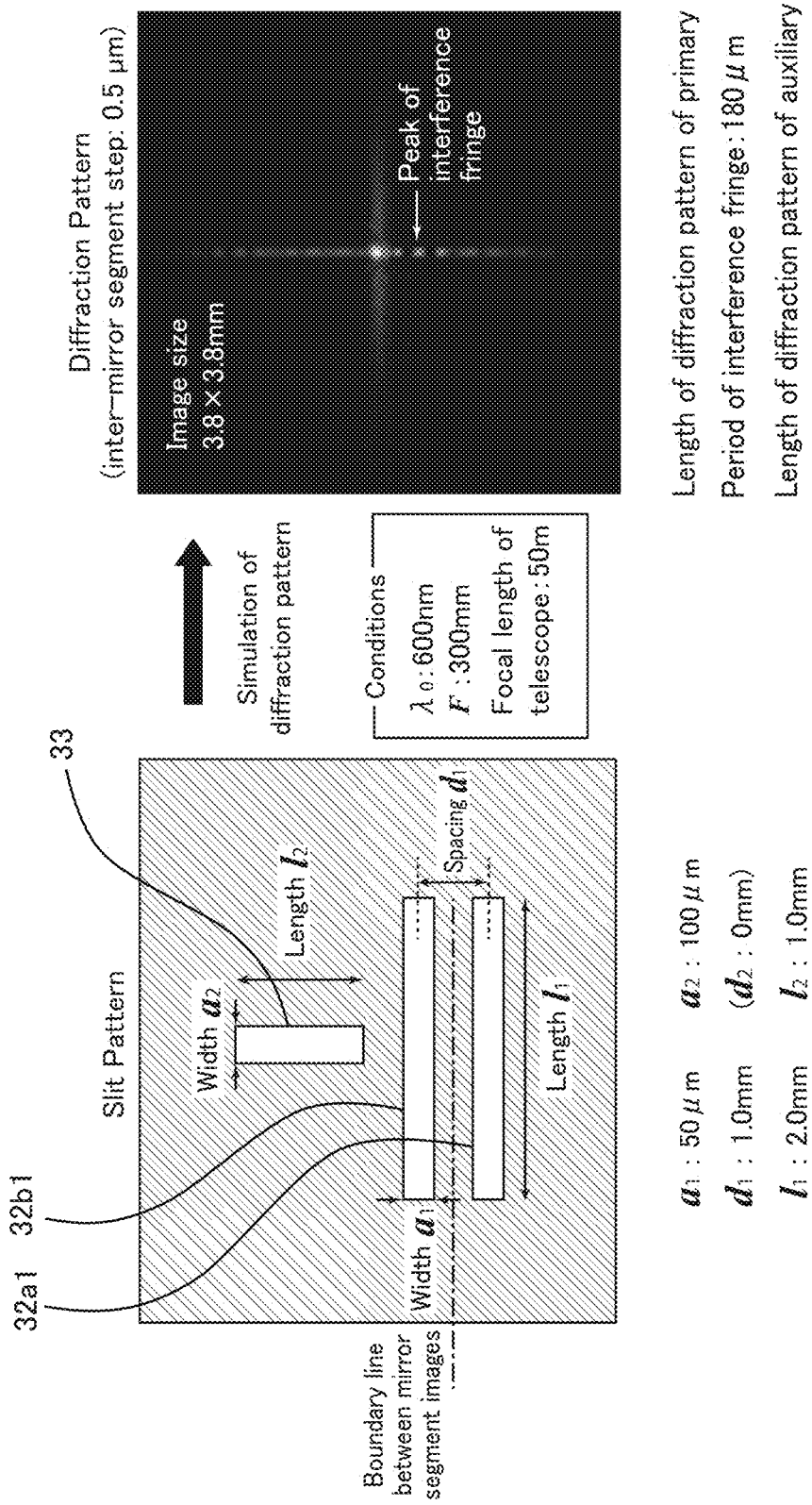
FIG. 14 is a diagram showing a design example of slits and an example of a resulting diffraction pattern (in the case where the number of auxiliary slits is one).

FIG. 14 is a diagram showing a specific design example of slits and an example of a resulting diffraction pattern in the case where the number of auxiliary slits is one. In a slit pattern illustrated on the left side of FIG. 14, each of two primary slits 32a1, 32b1 has a width $a_1$ of 50 μm, a length $l_1$ of 2.0 mm, and a spacing $d_1$ of 1.0 mm. Further, an auxiliary slit 33 has a width $a_2$ of 100 μm and a length $l_2$ of 1.0 mm. Since the auxiliary slit 33 is a single slit, there is not a spacing $d_2$ to be defined in the case where there are two auxiliary slits. Under the condition that: the center wavelength $\lambda_0$ of the light source is 600 nm; the focal length F of the lens after the slits is 300 mm; the focal length of a primary mirror system is 50 m; and the size of the inter-mirror segment step is 0.5 μm, a diffraction pattern from the slit pattern in this design example was derived by simulation, and shown on the right side of FIG. 14. Here, the diffraction pattern of the primary slits 32a1, 32b1 extends vertically to have a length of 3.8 mm, while forming an interference fringe, and the diffraction pattern of the auxiliary slit 33 extends horizontally to have a length of 1.9 mm. Further, the period of the interference fringe from the primary slits 32a1, 32b1 is 180 μm. The period of the interference fringe can be shortened approximately to a spatial resolution determined by a pixel pitch and an optical system of the detector. In the example illustrated in FIG. 14, it may be set to up to about 10 μm as a guide. When the spacing $d_1$ is increased, the period of the interference fringe is shortened in inverse proportion thereto. In the example illustrated in FIG. 14, the spacing $d_1$ can be increased up to about over ten times of 1.0 mm. Since the auxiliary slit is a single slit and thus an interference with a diffraction pattern from another auxiliary slit never occurs, the diffraction pattern of the auxiliary slit is formed as a pattern whose width gradually decreases toward an end thereof, without producing any interference fringe. The diffraction pattern of the auxiliary slit orthogonally intersects with the diffraction pattern of the primary slits to form an intersection point, so that this intersection point can be used as a criterion for identifying the position of the interference fringe in the diffraction pattern of the primary slits. Here, due to the 0.5 μm inter-mirror segment step, the peak of the interference fringe is shifted downwardly from the intersection point. From the formula 3, the shift amount of the interference fringe in a direction orthogonal to the primary slits is derived as 300 μm. From FIG. 14, it can be ascertained that the peak of the interference fringe illustrated in FIG. 14 is shifted at that level from the position of the intersection point formed between the diffraction pattern of the primary slits and the diffraction pattern of the auxiliary slit orthogonally intersecting therewith. As above, it is understood that the inter-mirror segment step can be derived by assigning the shift amount of the peak of the interference fringe measured through actual observation to the formula 3.

Figure 15:
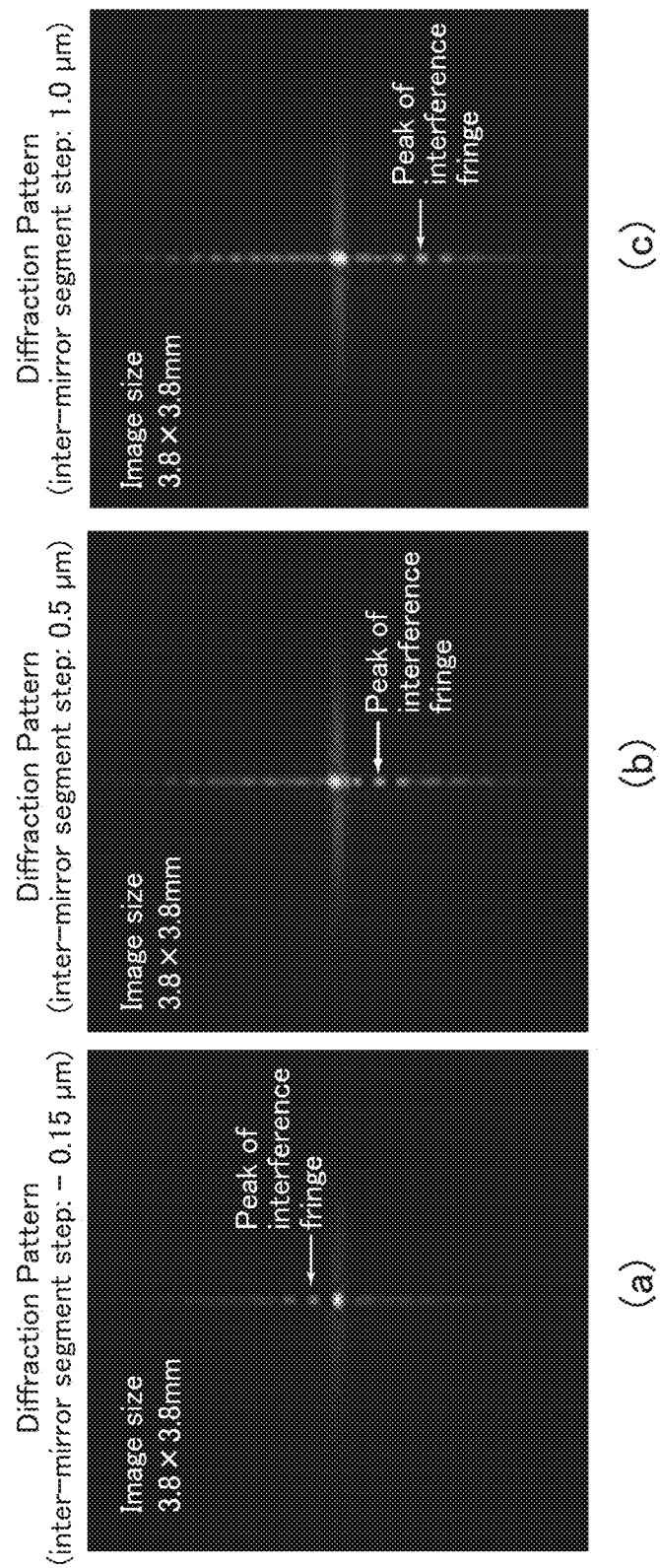
FIG. 15 is a diagram showing an example of a diffraction pattern of slits when the size of an inter-mirror segment step is changed (in the case where the number of auxiliary slits is one).

FIG. 15 is a diagram showing an example of a diffraction pattern of slits when the size of an inter-mirror segment step is changed (in the case where the number of auxiliary slits is one). FIGS. 15(a), 15(b) and 15(c) show three diffraction patterns obtained when the size of the inter-mirror segment step is −0.15 μm, 0.5 μm, and 1.0 μm, respectively. When the size of the inter-mirror segment step is −0.15 μm, the peak of the interference fringe in the diffraction pattern from the primary slits is located slightly above the intersection point. When the size of the inter-mirror segment step is 0.5 μm, the peak of the interference fringe is shifted to a position slightly below the intersection point. When the size of the inter-mirror segment step is 1.0 μm, the peak of the interference fringe is shifted further downwardly. Although not illustrated, when the size of the inter-mirror segment step is 0, the peak of the interference fringe comes to the position of the intersection point. As above, the vertical shift amount and position of the interference fringe in the diffraction pattern from the primary slits can be accurately identified by using the intersection point as a criterion, so that it is possible to accurately identify the size of the inter-mirror segment step.

(Specific Design Example of Slits—Two Auxiliary Slit)

Figure 16:
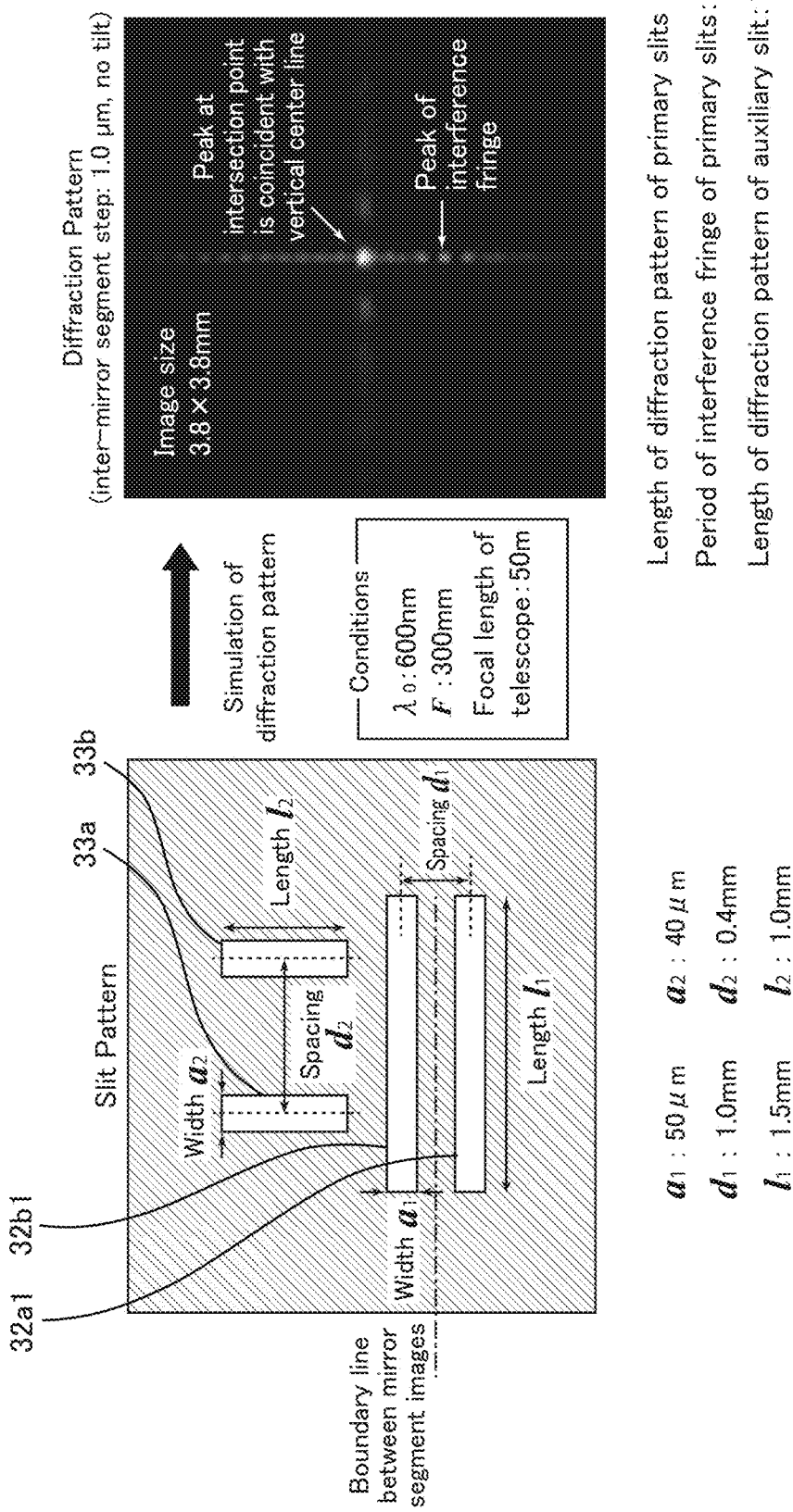
FIG. 16 is a diagram showing a specific design example of slits and an example of a resulting diffraction pattern (in the case where the number of auxiliary slits is two, and there is no tilt in a primary mirror).

When the reference slit is composed of two auxiliary slits, a tilt of each mirror segment can be detected. Thus, the presence or absence of the tilt of each mirror segment is added to the conditions for simulation. It is to be understood that, in the case where the reference slit is composed of one auxiliary slit or another primary slit, the presence or absence of the tilt of each mirror segment is not included in the conditions for simulation. FIG. 16 is a diagram showing a specific design example of slits and an example of a resulting diffraction pattern in the case where the number of auxiliary slits is two, and there is no tilt in the primary mirror. When the number of auxiliary slits is two, two diffracted ray groups passing through the two auxiliary slits interfere with each other to produce an interference fringe in the resulting diffraction pattern. In a slit pattern illustrated on the left side of FIG. 16, each of two primary slits 32a1, 32b1 has a width $a_1$ of 50 μm, a length $l_1$ of 1.5 mm, and a spacing $d_1$ of 1.0 mm. Further, each of two auxiliary slits 33a, 33b has a width $a_2$ of 40 μm, a length $l_2$ of 1.0 mm, and a spacing $d_2$ of 0.4 mm. Under the condition that: the center wavelength $\lambda_0$ of the light source is 600 nm; the focal length F of the lens after the slits is 300 mm; the focal length of a primary mirror system is 50 m; the size of the inter-mirror segment step is 1.0 μm; and there is no tilt in the primary mirror, a diffraction pattern from the slit pattern in this design example was derived by simulation, and shown on the right side of FIG. 16. Here, the diffraction pattern of the primary slits 32a1, 32b1 extends vertically to have a length of 3.8 mm, while forming an interference fringe, and the diffraction pattern of the auxiliary slits 33 extends horizontally to have a length of 1.9 mm, while forming an interference fringe. Further, the period of the interference fringe from the primary slits 32a1, 32b1 is 180 μm, and the period of the interference fringe from the auxiliary slits 33a, 33b is 450 μm. In the diffraction patterns, the diffraction pattern of the auxiliary slits orthogonally intersects with the diffraction pattern of the primary slits, so that a resulting intersection point can be used as a criterion for identifying the position of the interference fringe in the diffraction pattern of the primary slits. Further, the diffraction pattern of the auxiliary slits also produces an interference fringe as well as the diffraction pattern of the primary slits. Thus, when the diffraction pattern of the auxiliary slits deviates, the peak of the interference fringe in the diffraction pattern from the auxiliary slits is shifted from the center of the diffraction pattern, so that a peak in the intersection point between the diffraction pattern of the auxiliary slits and the diffraction pattern of the primary slits, as a position where the diffraction pattern of the auxiliary slits and the diffraction pattern of the primary slits strengthen each other to produce a bright point, will deviates. Therefore, the shift amount of the diffraction pattern of the auxiliary slits can be accurately identified by observing the position of the peak in the intersection point. As a criterion for identifying the position of the peak in the intersection point, a vertical venter line of the diffraction pattern of the primary slits can be used. In this example, due to the 1.0 μm inter-mirror segment step, the peak of the diffraction pattern of the primary slits is shifted downwardly from the intersection point. However, since there is no tilt in the primary mirror, the position of the peak in the intersection point is coincident with the vertical center line of the diffraction pattern of the primary slits.

FIG. 17 is a diagram showing a specific design example of slits and an example of a resulting diffraction pattern in the case where the number of auxiliary slits is two, and there is a tilt in the primary mirror. In a slit pattern illustrated on the left side of FIG. 17, each of two primary slits 32a1, 32b1 has a width $a_1$ of 50 μm, a length $l_1$ of 1.5 mm, and a spacing $d_1$ of 1.0 mm. Further, each of two auxiliary slits 33a, 33b has a width $a_2$ of 40 μm, a length $l_2$ of 1.0 mm, and a spacing $d_2$ of 0.4 mm. Under the condition that: the center wavelength $\lambda_0$ of the light source is 600 nm; the focal length F of the lens after the slits is 300 mm; the focal length of a primary mirror system is 50 m; the size of the inter-mirror segment step is 1.0 μm; and a tilt in the primary mirror is 50.0 μdeg, a diffraction pattern from the slit pattern in this design example was derived by simulation, and shown on the right side of FIG. 17. Here, the diffraction pattern of the primary slits 32a1, 32b1 extends vertically to have a length of 3.8 mm, while forming an interference fringe, and the diffraction pattern of the auxiliary slits 33 extends horizontally to have a length of 1.9 mm, while forming an interference fringe. Further, the period of the interference fringe from the primary slits 32a1, 32b1 is 180 μm, and the period of the interference fringe from the auxiliary slits 33a, 33b is 450 μm. When there is a tilt in the primary mirror, respective centers of the diffraction pattern from the primary slits 32a1, 32b1 and the center of the diffraction pattern from the auxiliary slits 33 become failing to be coincident with each other, and thereby the position of the peak in the intersection point will deviate from a vertical center line of the diffraction pattern of the primary slits. In this example, due to the 1.0 μm inter-mirror segment step, the peak of the diffraction pattern of the primary slits is shifted downwardly from the intersection point. Further, due to the presence of the tilt in the primary mirror, the peak in the intersection point deviates rightwardly from the vertical center line of the diffraction pattern of the primary slits. As above, the vertical shift amount and position of the interference fringe in the diffraction pattern of the primary slits can be accurately identified by using the intersection point as a criterion, so as to accurately identify the size of the inter-mirror segment step, and the shift amount of the peak in the intersection point, i.e., the shift amount of the diffraction pattern of the auxiliary slits, can be accurately identified by using the center line of the diffraction pattern of the primary slits as a criterion, so as to accurately identify the size of the tilt of each mirror segment. The inter-mirror segment step can be corrected by adjusting the peak of the interference fringe to come to the center of the diffraction pattern, and the tilt of each mirror segment can be corrected by adjusting the peak in the intersecting point to come to the center line of the diffraction pattern of the primary slits.

(Specific Design Example of Slits—in Case where Reference Slit is Composed of Another Primary Slit)

Figure 18:
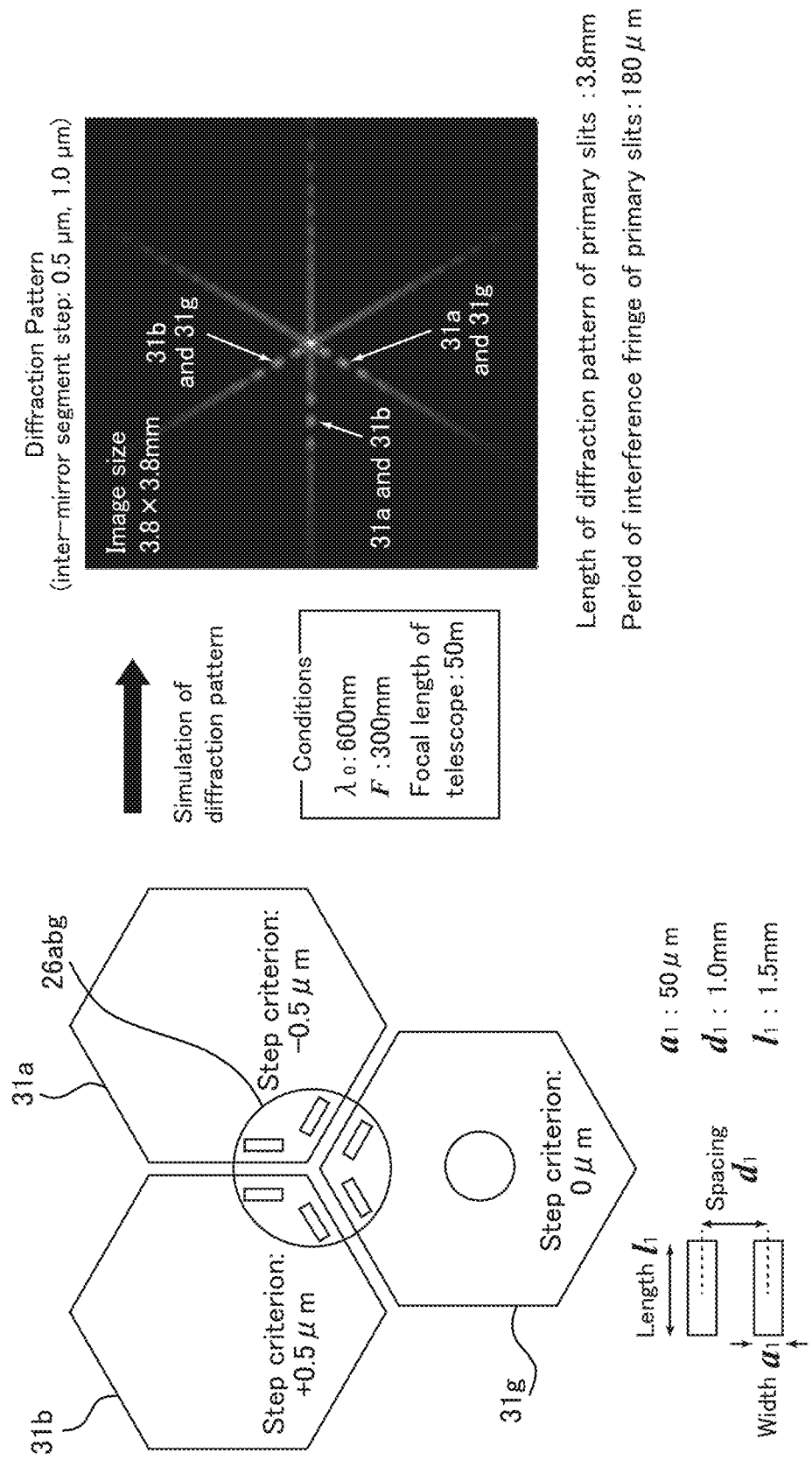
FIG. 18 is a diagram showing a specific design example of slits and an example of a resulting diffraction pattern (in the case where the reference slit is composed of another primary slit).

FIG. 18 is a diagram showing a specific design example of slits and an example of a resulting diffraction pattern in the case where the reference slit is composed of another primary slit. In a slit pattern illustrated on the left side of FIG. 18, three pairs of primary slits are formed adjacent to an intersection point of three boundaries among three mirror segment images 31a, 31b, 31c, such that each of the three pairs of primary slits are arranged parallel and opposed to each other across a corresponding one of the three boundaries, in respective opposed regions of two of the three mirror segment images, and a lens 26abg is disposed thereover. The three pairs of opposed primary slits are arranged at intervals of a rotation angle of 120 degrees. Each of the primary slits has a width $a_1$ of 50 μm, a length $l_1$ of 1.5 mm, and a spacing $d_1$ of 1.0 mm. Under the condition that: the center wavelength $\lambda_0$ of the light source is 600 nm; the focal length F of the lens after the slits is 300 mm; the focal length of a primary mirror system is 50 m; and, with regard to the inter-mirror segment step, the mirror segment images 31a, 31b are, respectively, at a position of −0.5 μm and a position of +0.5 μm, with respect to the mirror segment image 31g, a diffraction pattern from the slit pattern in this design example was derived by simulation, and shown on the right side of FIG. 18. Here, each of the diffraction patterns of the three pairs of primary slits extends to have a length of 3.8 mm, while forming an interference fringe, and the period of each of the interference fringes from the three pairs of primary slits is 180 μm. The diffraction patterns of the three pairs of primary slits intersect at one point at an intersection angle of 120 degrees to form an intersection point, so that this intersection point can be used as a criterion for identifying the position of the interference fringe in the diffraction pattern of the primary slits. The interference fringe in the diffraction pattern from the pair of primary slits in the mirror segment images 31a, 31b extends along a right-left direction, and the peak of the interference fringe is shafted leftwardly by a shift amount corresponding to 1.0 μm which is a step between mirror segments 10a, 10b corresponding to the mirror segment images 31a, 31b. The interference fringe in the diffraction pattern from the pair of primary slits in the mirror segment images 31b, 31g extends along an upper left-lower right direction, and the peak of the interference fringe is shafted leftwardly and upwardly by a shift amount corresponding to 0.5 μm which is a step between mirror segments 10b, 10g corresponding to the mirror segment images 31b, 31g. The interference fringe in the diffraction pattern from the pair of primary slits in the mirror segment images 31a, 31g extends along an lower left-upper right direction, and the peak of the interference fringe is shafted leftwardly and downwardly by a shift amount corresponding to 0.5 μm which is a step between mirror segments 10a, 10g corresponding to the mirror segment images 31a, 31g. As above, the shift amount and position of the interference fringe in the diffraction pattern of each the pairs of primary slits can be accurately identified by using the intersection point as a criterion, so as to accurately identify the size of the inter-mirror segment step. The inter-mirror segment step can be corrected by adjusting the peak of the interference fringe to come to the center of the diffraction pattern.

(Specific Design Example of Slits—in Case where Reference Slit is Composed of Rotated Primary Slit Pair)

FIG. 21 is a diagram showing an example of a diffraction pattern in the case where the reference slit is composed of a rotated primary slit pair. FIG. 21(a) shows an example of a diffraction pattern in the slit arrangement illustrated in FIG. 20 in which six rotated primary slit pairs intersect with each other at integral multiples of a unit angle of 30 degrees. Each of six diffraction patterns is formed as a straight line extending in a direction orthogonal to a corresponding one of the rotated primary slit pairs. FIG. 21(a) shows diffraction patterns corresponding to the rotated primary slit pairs 32p1 to 31p6. In each of the diffraction patterns, an interference fringe included therein and the position of the peak of the interference fringe can be identified by using an intersection with other diffraction patterns as a criterion. Then, based on the position of the peak of the interference fringe, the inter-mirror segment step can be identified. FIG. 21(b)

shows an example of a diffraction pattern in a case where the minimum value of an intersection angle between two of the rotated primary slit pairs (i.e., an intersection angle between two of the diffraction patterns) is 10 degrees. In this case, an intersection with other diffraction patterns can be used as a criterion. However, since the intersection angle between two of the diffraction patterns is relatively small, it becomes slightly difficult to distinguish interference fringes in adjacent diffraction patterns from each other in a position close to the intersection point. Then, when the minimum value of an intersection angle is less than 10 degrees, it becomes difficult to distinguish the interference fringes in the adjacent diffraction patterns from each other. Thus, the minimum value of an intersection angle is preferably set to 10 degrees or more. In the case where the reference slit is composed of a rotated primary slit pair, with regard to the rotated primary slit pair having a width $a_n$, a length $l_n$ and a spacing $d_n$ (spacing between the pair of rotated primary slits), a diffraction pattern having a length expressed by the formula 1 will be generated with an interference fringe having a period expressed by the formula 2.

(Specific Design Example of Slits—in Case where Reference Slit is Composed of Distributed Primary Slit Pair)

N example of a diffraction pattern in the case where the reference slit is composed of a distributed primary slit pair is illustrated. However, even in a distributed primary slit pair, it is possible to imagine the width $a_n$, the length $l_n$, the spacing (transverse distance) $d_n$ (spacing between the pair of distributed primary slits), a diffraction pattern having a length expressed by the formula 1 will be generated with an interference fringe having a period expressed by the formula 2. FIG. 22 shows a width $a_1$ and a length $l_1$ of the distributed primary slit 32a1d, and a spacing (transverse distance) $d_1$ between the pair of distributed primary slits 32a1d, 32e3d. Further, FIG. 22 shows a longitudinal distance d long between the pair of distributed primary slits 32a1d, 32e3d. Preferably, the longitudinal distance d long is not set to an excessively large value from a viewpoint of obtaining a clear interference fringe, although it exerts no influence on the period of the interference fringe in a direction orthogonal to the slits. The distributed primary slit pair arranged as shown in FIG. 22 can generate a clear interference fringe without any problem.

(Operation Flow of Adjustment of Step (and Tilt))

Figure 19:
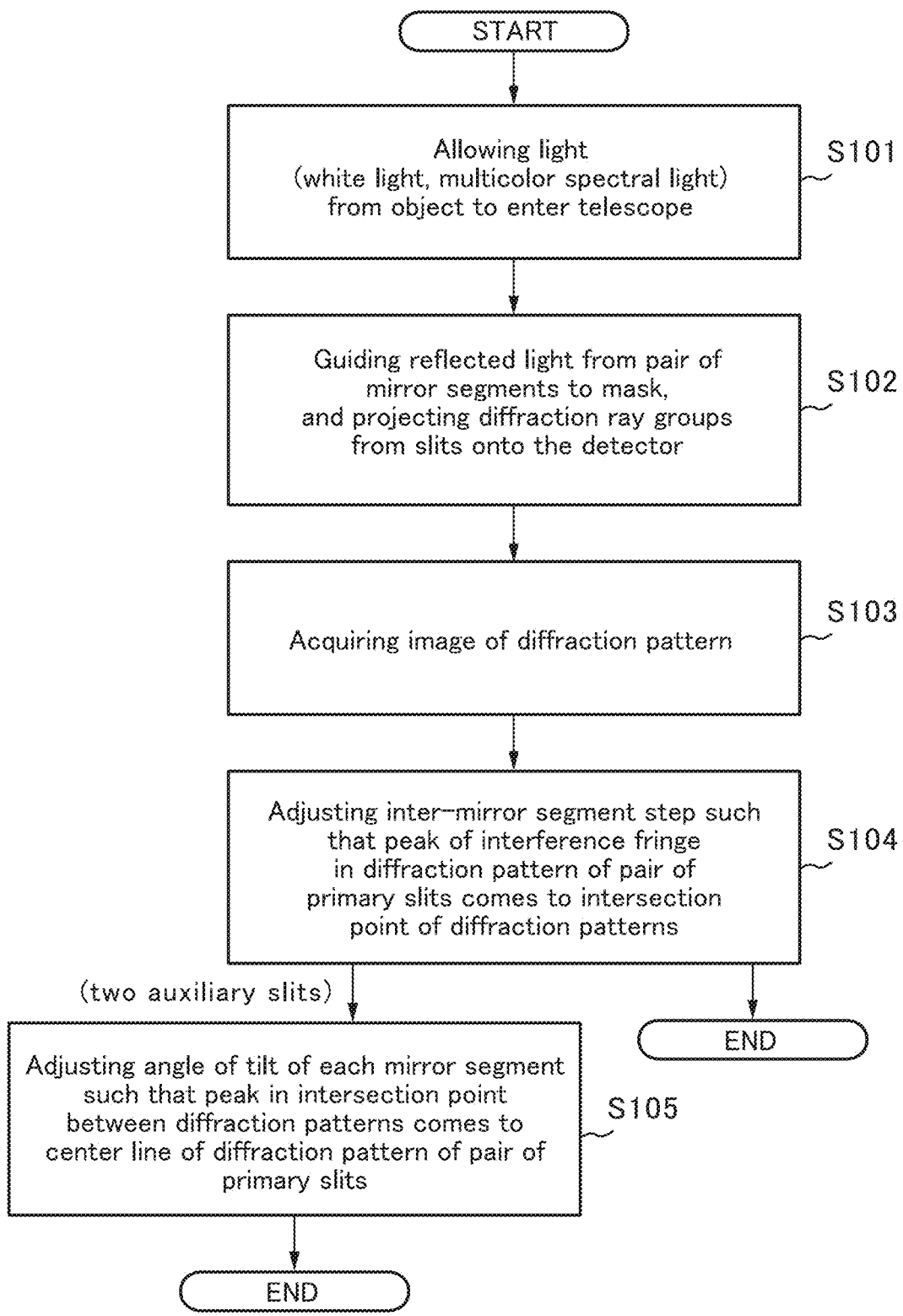
FIG. 19 is an operation flow chart of an operation for adjusting the step and tilt.

An operation flow of an operation for adjusting a step (and a tilt) using the step analysis mechanism 110. FIG. 19 is an operation flow chart of the operation for adjusting the step and tilt. First of all, the direction of the reflecting telescope 100 is changed to bring an object generating light serving as a criterion into a field-of-view thereof (step S101). The light serving as a criterion may be general non-monochromatic light such as white light or multicolor spectral light. The object may be an astronomical object or may be a ground object.

Subsequently, reflected light from a pair of mirror segments is guided to a mask, and diffraction ray groups from slits (pair of primary slits and a reference slit) are projected onto the detector 40 (step S102). Specifically, the direction of the reflecting telescope 100 is finely adjusted to allow light from the object to adequately enter the slits on the mask, thereby generating diffraction patterns by the diffraction ray groups, and projecting the diffraction patterns onto the detector 40. More specifically, the diffraction patterns are projected onto the detector 40, in a state in which shifting of the peak of an interference fringe corresponding to the size of the inter-mirror segment step (and, in the case where the reference slit is composed of two auxiliary slits, shifting of the peak in the intersection point corresponding to the tilt of each mirror segment) occurs.

Subsequently, an image of the diffraction patterns is acquired from the detector 40 (step S103). Specifically, image data is read from the detector, and the read image data is loaded on an analytical computer. The image loaded on the computer is displayed on a display so as to allow an operator to check it. A pixel pitch of the detector is known, so that it is possible to identify the size of an actual pattern from the image. The image may be displayed while a scale indicative of the size of a pattern is superimposed thereon. Further, the scale may be configured to indicate the size of a step corresponding to the size of a pattern. This makes it possible to accurately identify the absolute value of the shift amount of an actual interference fringe or the like indicated by the image.

Subsequently, the inter-mirror segment step is adjusted such that the peak of the interference fringe in the diffraction pattern of the pair of primary slits comes to the intersection point of the diffraction patterns (step S104). Specifically, the step is corrected by operating an adjustment mechanism to adjust the position of at least one of two of a plurality of mirror segments, such that the peak of the interference fringe in the diffraction pattern generated from the pair of primary slits formed correspondingly to paired regions of the two mirror segments comes to the position of the intersection point of the diffraction pattern of the pair of primary slits and the diffraction pattern of the reference slit. This makes it possible to identify the inter-mirror segment step, and make an adjustment to eliminate the inter-mirror segment step. In the case where the reference slit is composed of one auxiliary slit with respect to one pair of primary slits, or composed of another primary slit, the adjustment is completed in this step.

In the case where the reference slit is composed of two auxiliary slits with respect to one pair of primary slits, the tilt of each mirror segment may be detected and adjusted. For this purpose, the angle of the tilt of each mirror segment is adjusted such that a peak of an intersection point between the interference fringes in the two diffraction patterns comes to the center line of the diffraction pattern of the pair of primary slits (step S105). Specifically, the tilt of a tilted one of the mirror segments is corrected by operating an adjustment mechanism, such that the peak in an intersection point between respective diffraction patterns of the pair of primary slits and the reference slit formed correspondingly to the paired regions of the two mirror segments comes to the center line of the diffraction pattern of the pair of primary slits. This makes it possible to further identify the tilt of each mirror segment, and make an adjustment to eliminate the tilt.

INDUSTRIAL APPLICABILITY

The present invention is usable in a telescope comprising a primary mirror composed of a plurality of mirror segments, and used in a space telescope or a terrestrial telescope, for correcting a step or tilt in the mirror segments.

LIST OF REFERENCE SIGNS

1: reflecting telescope
10: mirror segment
11: step analysis mechanism
20: secondary mirror
21: focal plane
22: focal point mask 25: lens
26: lens
30: mask
31: mirror segment image
32: primary slit
33: auxiliary slit (in case where number thereof is one)
34: auxiliary slit (in case where number thereof is two)
40: detector
50: diffraction pattern
51: diffraction pattern
52: diffraction pattern
100: reflecting telescope
110: step analysis mechanism

The invention claimed is:

1. A device designed for use with a telescope whose primary mirror is composed of a plurality of mirror segments, and to analyze a size of a step between paired regions of the plurality of mirror segments, the device comprising:
  a mask disposed in an optical axis of the primary mirror orthogonally to the optical axis at a given position where a plurality of mirror segment images as respective projected images of the plurality of mirror segments do not overlap each other, wherein a plurality of primary slits is formed at respective positions in the mirror segment images, each of the primary slits being adjacent to a boundary between the paired regions of the mirror segment images and being opposed and parallel to each other with a given spacing therebetween; and
  a detector disposed in an optical axis of the telescope at a position downstream of the mask;
  wherein at least one reference slit is arranged with respect to each of pairs of the primary slits in the mask, such that the at least one reference slit extends at a given angle from a longitude of each of the primary slits, and the given angle is not parallel to each of the pairs of primary slits.

2. The device as recited in claim 1, wherein the reference slit is an auxiliary slit which is formed in one of the paired regions of the two mirror segment images, in which one of the pair of primary slits is located, at a position adjacent to the one primary slit, to extend at a given angle with respect to the pair of primary slits.

3. The device as recited in claim 2, wherein the auxiliary slit has a right angle with respect to the pair of primary slits.

4. The device as recited in claim 2, wherein the auxiliary slit is composed of a pair of mutually-parallel slits.

5. The device as recited in claim 1, wherein
  the pair of primary slits are formed along the boundary between the paired regions of the two mirror segment images, and
  the reference slit is composed of another primary slit other than the pair of primary slits, disposed along another boundary adjacent to the boundary along which the pair of primary slits are arranged.

6. The device as recited in claim 1, wherein
  each of the pair of primary slits is formed to extend at a given angle which is not parallel to the boundary between the paired regions of the two mirror segment images, and
  the reference slit is composed of another primary slit other than the pair of primary slits, disposed to extend at a given angle which is not parallel to another boundary other than and adjacent to the boundary along which the pair of primary slits are arranged.

7. The device as recited in claim 6, wherein the plurality of pairs of primary slits are arranged such that directions thereof intersect with each other at different angles.

8. The device as recited in claim 7, wherein the plurality of pairs of primary slits are arranged such that directions thereof intersect with each other at integral multiples of a unit angle.

9. A device designed for use with a telescope whose primary mirror is composed of a plurality of mirror segments separated from each other, and to analyze a size of a step between paired regions of the plurality of mirror segments, the device comprising:
  a mask disposed in an optical axis of the primary mirror orthogonally to the optical axis at a given position where a plurality of mirror segment images as respective projected images of the plurality of mirror segments do not overlap each other, wherein a plurality of primary slits is formed at respective positions in the mirror segment images, each of the primary slits being arranged parallel to each other with a given transverse distance therebetween while being spaced apart from each other by a given longitudinal distance, said given transverse distance being a distance between parallel lines including center lines of each two of the formed primary slits, and said given longitudinal distance being a distance between centers of each two of the mirror segment images; and
  a detector disposed in an optical axis of the telescope at a position downstream of the mask;
  wherein pairs of the plurality of primary slits are arranged in the mask such that directions thereof intersect with each other at different angles.

10. The device as recited in claim 1, wherein the given position where the plurality of mirror segment images do not overlap each other is at a pupil plane of the telescope.

11. The device as recited in claim 1, which comprises a focal plane mask having a pinhole for allowing light focused at a center of a focal plane of the primary mirror to pass therethrough.

12. The device as recited in claim 1, which further comprises an imaging lens system comprising an array of lenses, respective centers thereof being arranged correspondingly to respective intersection points between corresponding ones of center lines of the plurality of pairs of primary slits and center lines of the reference slits.

13. A method designed for use in a telescope whose primary mirror is composed of a plurality of mirror segments, and to eliminate a step between paired regions of the plurality of mirror segments, using the device as recited in claim 4, the method comprising the steps of:
  acquiring, by the detector, an image of diffraction patterns generated by the pair of primary slits and the pair of auxiliary slits;
  adjusting the step between the paired regions of the two mirror segments such that a peak of an interference fringe in the diffraction pattern of the pair of primary slits comes to an intersection point between the diffraction patterns; and
  adjusting an angle of tilt of each of the mirror segments such that a peak in the intersection point between the diffraction pattern of the pair of auxiliary slits and the diffraction pattern of the pair of primary slits comes on a center line of the diffraction pattern of the pair of primary slits.

* * * * *